United States Patent
Takano et al.

(10) Patent No.: US 9,480,053 B2
(45) Date of Patent: Oct. 25, 2016

(54) COMMUNICATION CONTROL DEVICE, COMMUNICATION CONTROL METHOD, AND TERMINAL DEVICE

(71) Applicant: Sony Corporation, Tokyo (JP)

(72) Inventors: Hiroaki Takano, Saitama (JP); Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/397,906

(22) PCT Filed: Mar. 13, 2013

(86) PCT No.: PCT/JP2013/056993
§ 371 (c)(1),
(2) Date: Oct. 30, 2014

(87) PCT Pub. No.: WO2013/168467
PCT Pub. Date: Nov. 14, 2013

(65) Prior Publication Data
US 2015/0117348 A1    Apr. 30, 2015

(30) Foreign Application Priority Data

May 10, 2012 (JP) ................................. 2012-108874

(51) Int. Cl.
*G01R 31/08* (2006.01)
*H04W 72/04* (2009.01)
*H04W 16/10* (2009.01)

(52) U.S. Cl.
CPC ..... *H04W 72/0406* (2013.01); *H04W 72/0426* (2013.01); *H04W 72/0453* (2013.01); *H04W 16/10* (2013.01); *H04W 72/048* (2013.01)

(58) Field of Classification Search
CPC ................................. H04W 72/0406
USPC .................. 370/216–253, 328–339
See application file for complete search history.

(56) References Cited

U.S. PATENT DOCUMENTS

| | | | |
|---|---|---|---|
| 8,452,240 B2 | 5/2013 | Takahashi | |
| 8,533,370 B2 | 9/2013 | Tanaka et al. | |
| 8,995,942 B2 | 3/2015 | Watanabe | |
| 2005/0030979 A1* | 2/2005 | Malloy | H04L 41/14 370/516 |

(Continued)

FOREIGN PATENT DOCUMENTS

| | | |
|---|---|---|
| JP | 2012-010310 A | 1/2012 |
| JP | 2014-523725 A | 9/2014 |
| WO | WO 2013/014169 A1 | 1/2013 |

OTHER PUBLICATIONS

[No Author Listed], Discussion on further enhancements to LTE TDD for dynamic TDD UL-DL configuration. CMCC. 3rd Generation Partnership Project TSG-RAN WGl #68. Feb. 10, 2012:5 pages.

(Continued)

*Primary Examiner* — Iqbal Zaidi
(74) *Attorney, Agent, or Firm* — Wolf, Greenfield & Sacks, P.C.

(57) ABSTRACT

There is provided a communication control device including a radio communication unit which communicates with one or more terminal devices in a cell over a channel in which a link direction is allowed to be dynamically set for each sub-frame which is a unit of time in radio communication, and a control unit which controls allocation of communication resources to the terminal device based on the setting of the link direction of the channel and a location of the terminal device in the cell.

17 Claims, 24 Drawing Sheets

(56) References Cited

U.S. PATENT DOCUMENTS

| | | | |
|---|---|---|---|
| 2009/0093219 A1* | 4/2009 | Katada | H04W 8/005 455/69 |
| 2011/0076965 A1 | 3/2011 | Takahashi | |
| 2011/0081870 A1 | 4/2011 | Watanabe | |
| 2011/0106984 A1 | 5/2011 | Tanaka et al. | |
| 2011/0177834 A1* | 7/2011 | Shin | H04J 11/0033 455/501 |
| 2014/0307685 A1 | 10/2014 | Takano | |
| 2015/0110083 A1 | 4/2015 | Takano | |
| 2015/0119064 A1 | 4/2015 | Takano | |
| 2015/0139108 A1 | 5/2015 | Takano | |
| 2015/0156006 A1 | 6/2015 | Takano et al. | |
| 2015/0195064 A1 | 7/2015 | Takano | |
| 2016/0080135 A1 | 3/2016 | Takano et al. | |

OTHER PUBLICATIONS

[No Author Listed], on support of different TDD UL-DL configurations on different bands. Ericsson. 3rd Generation Partnership Project TSG-RAN WGI #67. Nov. 18, 2011:6 pages.

[No Author Listed], Overall structure of TDD CA with different UL-DL configurations based on half-duplex operation. LG Electroncs. 3rd Generation Partnership Project TSG-RAN WGI #67. Nov. 18, 2011:7 pages.

[No Author Listed], Need and feasibility of using different uplink-downlink configurations for TDD HeNBs in heterogeneous networks. New Postcom. 3rd Generation Partnership Project TSG-RAN WGI #61. Jul. 2, 2010:6 pages.

[No Author Listed], Remaining PUSCH issues in aggregation of TDD carriers with different UL/DL configurations. Ericcson. 3rd Generation Partnership Project TSG-RAN WGI #68. Mar. 30, 2012:5 pages.

[No Author Listed], Application Scenario of dynamic UL/DL asymmetry for TDD system. CMCC. $3^{rd}$ Generation Partnership Project TSG-RAN WG1 #65. May 13, 2011; 6 pages.

[No Author Listed], Issues in further enhancements to LTE TDD. LG Electronics, 3 GPP TSG-RAN WG1#68Bis, 3GPP, Mar. 30, 2012, R1-121461.

[No Author Listed], Alcatel-Lucent, Alcatel-Lucent Shanghai Bell, Scenarios for Further Enhanced Non CA-based ICIC for LTE, 3rd Generation Partnership Project TSG-RAN WG1 Meeting #66, R1-112411, Athens, Greece, Aug. 22-26, 2011, 9 pages.

[No Author Listed], Alcatel-Lucent, Alcatel-Lucent Shanghai Bell, TDD DL-UL Reconfiguration Study Item, 3rd Generation Partnership Project TSG-RAN WG4 Meeting #60, R4-114063, Athens, Greece, Aug. 22-26, 2011, 5 pages.

* cited by examiner

FIG. 3

| | #0 D | #1 S | #2 U | #3 U | #4 U | #5 D | #6 S | #7 U | #8 U | #9 U |
|---|---|---|---|---|---|---|---|---|---|---|
| Configuration 0 | #0 D | #1 S | #2 U | #3 U | #4 U | #5 D | #6 S | #7 U | #8 U | #9 U |
| Configuration 1 | #0 D | #1 S | #2 U | #3 U | #4 D | #5 D | #6 S | #7 U | #8 U | #9 D |
| Configuration 2 | #0 D | #1 S | #2 U | #3 D | #4 D | #5 D | #6 S | #7 U | #8 D | #9 D |
| Configuration 3 | #0 D | #1 S | #2 U | #3 U | #4 U | #5 D | #6 D | #7 D | #8 D | #9 D |
| Configuration 4 | #0 D | #1 S | #2 U | #3 U | #4 D | #5 D | #6 D | #7 D | #8 D | #9 D |
| Configuration 5 | #0 D | #1 S | #2 U | #3 D | #4 D | #5 D | #6 D | #7 D | #8 D | #9 D |
| Configuration 6 | #0 D | #1 S | #2 U | #3 U | #4 U | #5 D | #6 S | #7 U | #8 U | #9 D |

COMMUNICATION CONTROL DEVICE, COMMUNICATION CONTROL METHOD, AND TERMINAL DEVICE

TECHNICAL FIELD

The present disclosure relates to communication control devices, communication control methods, and terminal devices.

BACKGROUND ART

At present, radio communication systems which are compliant with LTE (Long Term Evolution), which is a standard developed by the Third Generation Partnership Project (3GPP), have been introduced. Moreover, as a fourth generation standard for radio communication systems, LTE-Advanced is being studied. In radio communication systems compliant with LTE or LTE-Advanced, frequency-division duplex (FDD) or time-division duplex (TDD) may be employed.

In radio communication systems compliant with LTE, FDD is typically employed. TDD has several advantages over FDD. For example, in FDD, it is necessary to provide a pair of an uplink frequency band and a downlink frequency band, while, in TDD, it is necessary to provide a single frequency band. Also, in FDD, the ratio of uplink communication resources and downlink communication resources is fixed, while, in TDD, the ratio of uplink communication resources and downlink communication resources is variable. Specifically, in TDD, the ratio of uplink communication resources and downlink communication resources can be changed by changing the link direction configuration of each sub-frame in a radio frame. Because of such advantages, it is expected that TDD will be increasingly employed in radio communication systems compliant with LTE or LTE-Advanced. Therefore, various techniques related to LTE TDD have been proposed.

For example, Patent Literature 1 discloses a technique of shifting the boundary between a downlink sub-frame and an uplink sub-frame, and communicating with another Home NodeB using a sub-frame between the boundaries before and after the shifting, thereby achieving radio communication between Home eNodeBs.

CITATION LIST

Patent Literature

Patent Literature 1: JP 2012-10310A

SUMMARY OF INVENTION

Technical Problem

In TDD, the ratio of uplink communication resources and downlink communication resources is variable, and therefore, different link direction configurations may be set for different cells, taking the downlink or uplink traffic rate into account. However, when different link direction configurations are set for different cells, related cells may have different link directions in the same sub-frame, and as a result, interference may occur between the related cells. For example, when a piece of user equipment (UE) which is receiving a downlink signal from an eNodeB in a cell receives an uplink signal of a UE in a cell adjacent to that cell, the uplink signal may interfere with the downlink signal. When the link direction configuration is dynamically set based on an increase or decrease in the uplink or downlink traffic rate in each cell in order to further improve throughput, it is considerably difficult to control the interference between cells.

Therefore, it is desirable to reduce the interference between related cells while improving throughput in a radio communication system employing TDD.

Solution to Problem

According to the present disclosure, there is provided a communication control device including a radio communication unit which communicates with one or more terminal devices in a cell over a channel in which a link direction is allowed to be dynamically set for each sub-frame which is a unit of time in radio communication, and a control unit which controls allocation of communication resources to the terminal device based on the setting of the link direction of the channel and a location of the terminal device in the cell.

According to the present disclosure, there is provided a communication control method including communicating with one or more terminal devices in a cell over a channel in which a link direction is allowed to be dynamically set for each sub-frame which is a unit of time in radio communication, and controlling allocation of communication resources to the terminal device based on the setting of the link direction of the channel and a location of the terminal device in the cell.

According to the present disclosure, there is provided a terminal device including a radio communication unit which communicates with a base station in a cell over a channel in which a link direction is allowed to be dynamically set for each sub-frame which is a unit of time in radio communication. The radio communication unit communicates with the base station according to allocation of communication resources to the terminal device itself by the base station based on the setting of the link direction of the channel and a location of the terminal device itself in the cell.

Advantageous Effects of Invention

As described above, according to the present disclosure, according to the communication control device, communication control method, and terminal device, the interference between related cells can be reduced while improving throughput in a radio communication system employing TDD.

BRIEF DESCRIPTION OF DRAWINGS

FIG. 3 is a diagram for describing an example link direction configuration of each sub-frame in a radio frame of TDD.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that a description will be given in the following order.

1. Introduction
1. 1. General Idea of TDD
1. 2. Technical Problem with TDD
2. First Embodiment
2. 1. Overview
2. 2. Configuration of eNodeB
2. 3. Configuration of UE
2. 4. Flow of Process
2. 5. Variations
3. Second Embodiment
3. 1. Overview
3. 2. Configuration of eNodeB
3. 3. Flow of Process
4. Third Embodiment
4. 1. Overview
4. 2. Configuration of eNodeB
4. 3. Flow of Process
5. Fourth Embodiment
5. 1. Overview
5. 2. Configuration of eNodeB
5. 3. Flow of Process
6. Summary

1. Introduction

Firstly, the general idea of TDD and a technical problem with TDD will be described. Although the general idea and technical problem, and embodiments, will be described herein using a radio communication system compliant with LTE or LTE-Advanced as an example, the present disclosure is, of course, not limited to the example.

1.1. General Idea of TDD

The general idea of TDD will be described with reference to FIGS. 1-3.

(TDD in LTE)

In LTE, any one of FDD and TDD may be employed. In FDD, an uplink-dedicated frequency band and a downlink-dedicated frequency band are used in the frequency direction. Also, in FDD, a format in which a radio frame includes 10 sub-frames is used in the time direction. On the other hand, also in TDD, a format in which a radio frame includes 10 sub-frames is used in the time direction. However, in TDD, the same frequency band is used for both uplink and downlink communication. The radio frame format in TDD will now be more specifically described with reference to FIG. 1.

Figure 1:
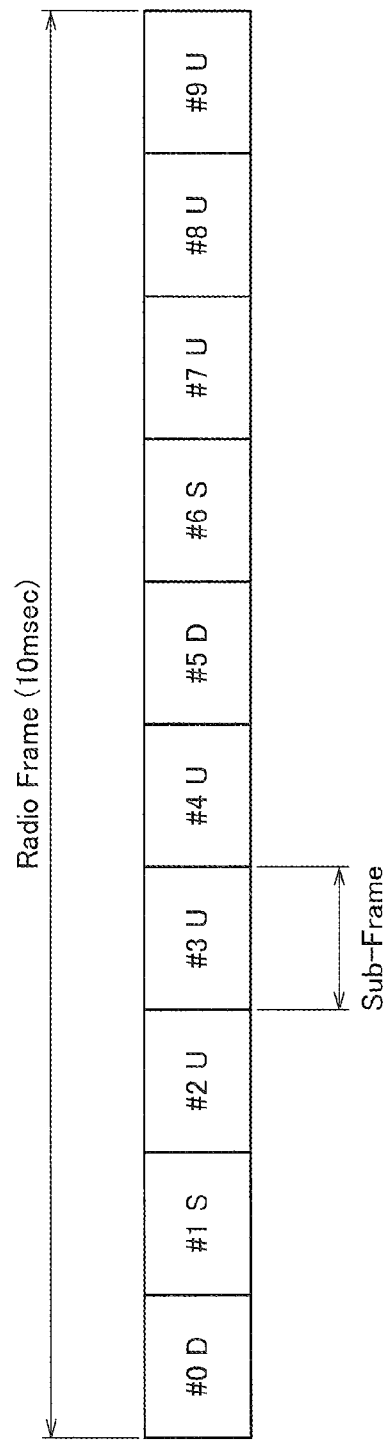
FIG. 1 is a diagram for describing an example radio frame format of TDD.

FIG. 1 is a diagram for describing an example radio frame format of TDD. Referring to FIG. 1, the radio frame is a unit of time in LTE, which has a length of 10 ms. Moreover, one radio frame includes 10 sub-frames. The sub-frame is also a unit of time in LTE, which has a length of 1 ms. In TDD, the link direction is set for each sub-frame. For example, in the radio frame of FIG. 1, the link direction of the sub-frame #0 is set to the downlink direction, and the link direction of the sub-frame #3 is set to the uplink direction.

Here, "uplink" refers to communication from a UE to an eNodeB, and "downlink" refers to communication from an eNodeB to a UE. In FIG. 1, D, U, and S indicate a downlink sub-frame, an uplink sub-frame, and a special sub-frame, respectively. The special sub-frame will be described below.

In radio communication systems compliant with LTE, FDD is typically employed. However, TDD has several advantages over FDD.

For example, TDD has an advantage in terms of provision of a frequency band. In FDD, it is necessary to provide a pair of an uplink frequency band and a downlink frequency band, while, in TDD, it is necessary to provide a single frequency band.

Also, for example, TDD has an advantage in terms of the ratio of uplink and downlink. As an example, in FDD, when an uplink frequency band of 20 MHz and a downlink frequency band of 20 MHz are provided, the ratio of uplink communication resources and downlink communication resources is fixed to "one to one." On the other hand, in TDD, when a frequency band of 20 MHz is provided, the ratio of uplink communication resources and downlink communication resources is variable. Specifically, in TDD, by changing the link direction configuration (hereinafter referred to as a "TDD configuration") of each sub-frame in a radio frame, the ratio of uplink communication resources and downlink communication resources can be changed.

Because of such advantages, it is expected that TDD will be increasingly used in radio communication systems compliant with LTE or LTE-Advanced.

Although TDD has the above advantages, it is necessary to allocate a period of time for switching between downlink and uplink. Therefore, in TDD, a special sub-frame is inserted between a downlink sub-frame and an uplink sub-frame. The special sub-frame will now be more specifically described with reference to FIG. 2.

Figure 2:
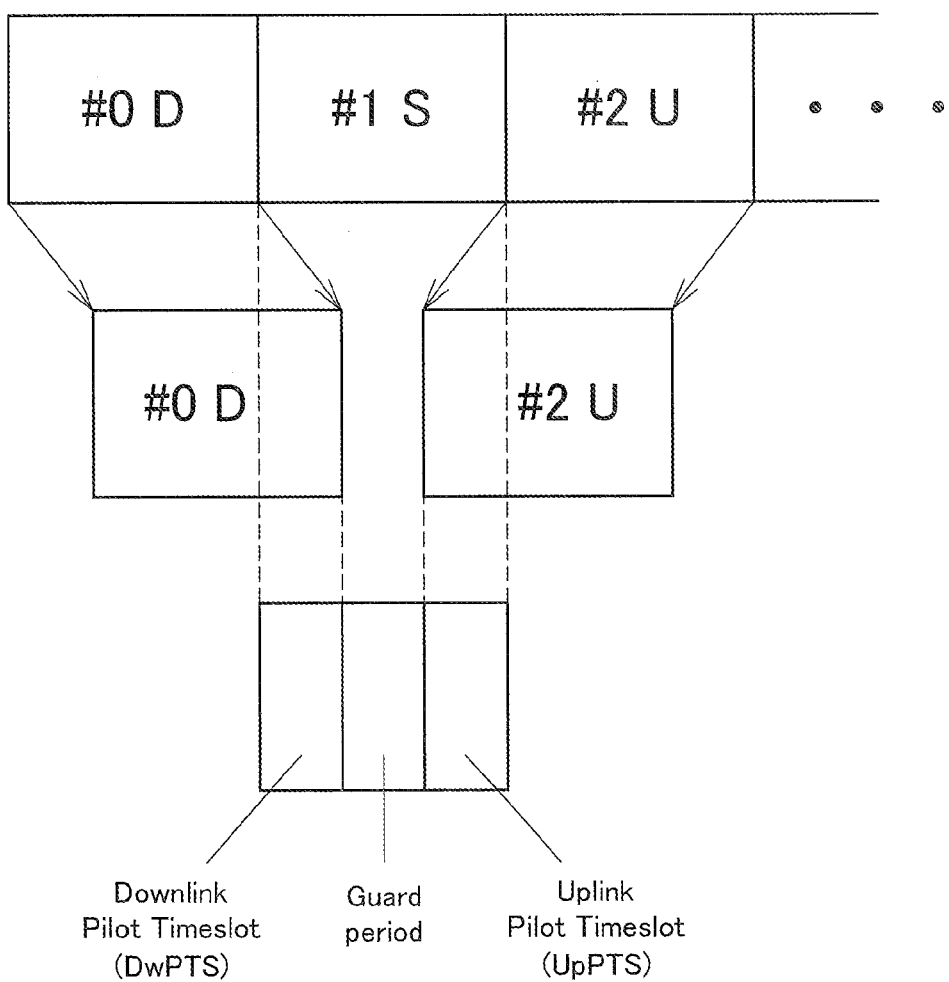
FIG. 2 is a diagram for describing an example special sub-frame included in a radio frame of TDD.

FIG. 2 is a diagram for describing an example of the special sub-frame included in the radio frame of TDD. Referring to FIG. 2, the sub-frames #0-#2 of the radio frame of FIG. 1 are shown. Here, the sub-frame #0 is a downlink sub-frame, the sub-frame #1 is a special sub-frame, and the sub-frame #2 is an uplink sub-frame. For an eNodeB, time when a UE receives the downlink signal of the sub-frame #0 is caused to be later than the time of the sub-frame #0 in the format due to a transmission delay in space and a process delay in the UE. Also, in order to cause data to arrive at the eNodeB at the time of the sub-frame #2 in the format, the UE needs to transmit an uplink signal in advance. Therefore, the special sub-frame is defined as a region for allocating a period of time corresponding to the delay of downlink and a period of time by which uplink is advanced. Specifically, the special sub-frame includes a downlink pilot time slot (DwPTS) and an uplink pilot time slot (UpPTS). Also, the special sub-frame further includes a guard period. Thus, TDD has the disadvantage that a special sub-frame is inserted during switching between downlink and uplink.

(Specific TDD Configuration)

LTE TDD is defined in 3GPP Release 8. In "TS 36. 211 Table 4. 2-2: Uplink-Downlink configurations," the link direction configuration (i.e., the TDD configuration) of each sub-frame in the radio frame of TDD is shown. The TDD configuration will now be more specifically described with reference to FIG. 3.

FIG. 3 is a diagram for describing an example of the link direction configuration of each sub-frame in the radio frame of TDD. Referring to FIG. 3, in 3GPP, seven TDD configurations, i.e., configurations 0-6, are defined. As described above, in LTE TDD, the radio frame includes 10 sub-frames, and the link direction is set for each sub-frame. In the sub-frames #0 and #5 of the 10 sub-frames, a synchronization signal is transmitted from an eNodeB, and therefore, the link directions of the sub-frames #0 and #5 are invariably fixed to the downlink direction. Moreover, the sub-frame #1 is a special sub-frame in any TDD configuration. Also, the link direction of the sub-frame #2 is fixedly set to the uplink direction. On the other hand, the sub-frame #6 is either a special sub-frame or a downlink sub-frame. The link directions of the sub-frames #3, #4, #7, #8, and #9 are set to either the uplink direction or the downlink direction.

It is typically supposed that each operator selects and uses any one of the seven TDD configurations. Therefore, for example, it is not supposed that each operator sets different TDD configurations for adjacent cells.

1.2. Technical Problem with TDD

Next, a technical problem with TDD will be described with reference to FIGS. 4-6.

(Example Specific Interference)

In the 3GPP Plenary Meetings held in Kansas City in March 2011, a decision was made to study the interference problem by setting different TDD configurations for adjacent cells. As a result, in LTE TDD, the general trend has been toward setting of different TDD configurations for related cells (e.g., adjacent cells). Specific interference which occurs when different TDD configurations are set for related cells (e.g., for adjacent cells, or for a macrocell and a small cell) will now be more specifically described with reference to FIGS. 4-6.

Figure 4:
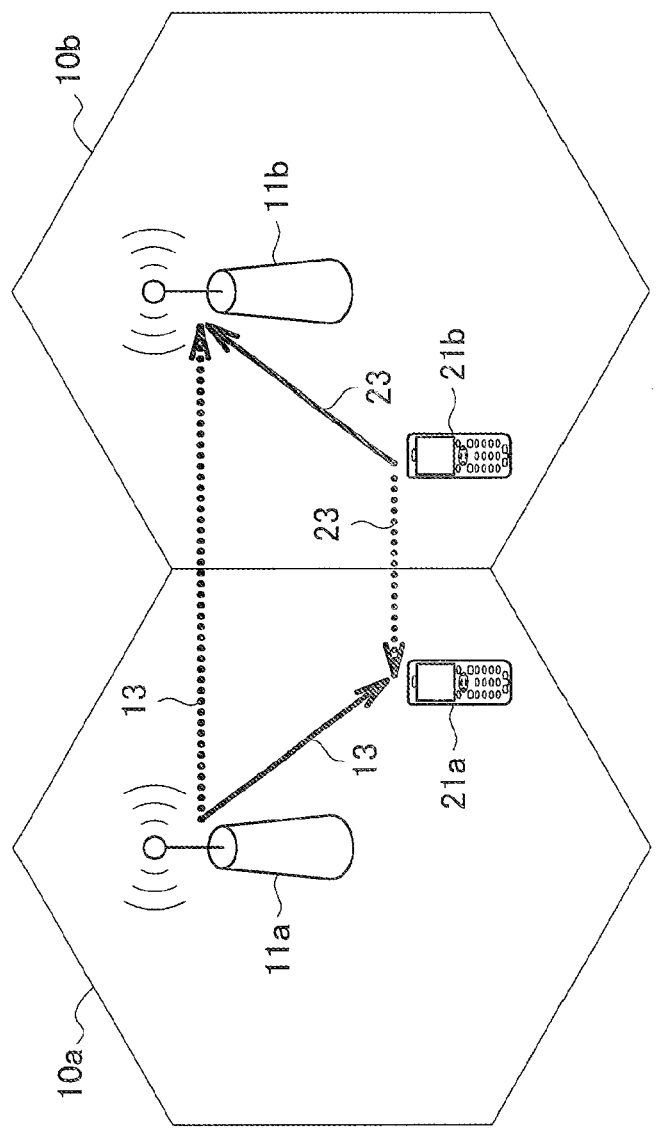
FIG. 4 is a diagram for describing example interference in a sub-frame in which a link direction is different between adjacent cells.

FIG. 4 is a diagram for describing example interference in a sub-frame in which the link direction is different between adjacent cells. Referring to FIG. 4, a cell 10a and a cell 10b adjacent to the cell 10a are shown. Also, in the cell 10a, there are an eNodeB 11a and a UE 21a. In the cell 10b, there are an eNodeB 11b and a UE 21b. Here, it is assumed that, in some sub-frame, the link direction is the downlink direction in the cell 10a, while the link direction is the uplink direction in the cell 10b. In this case, when the UE 21a which is receiving a downlink signal 13 from the eNodeB 11a in the cell 10a receives an uplink signal 23 from the UE 21b in the cell 10b, the uplink signal 23 may interfere with the downlink signal 13. Also, when the eNodeB 11b which is receiving the uplink signal 23 from the UE 21b in the cell 10b receives the downlink signal 13 from the eNodeB 11a in the cell 10a, the downlink signal 13 may interfere with the uplink signal 23. Specifically, the interfering signals are indicated by a dotted line in FIG. 4.

Figure 5:
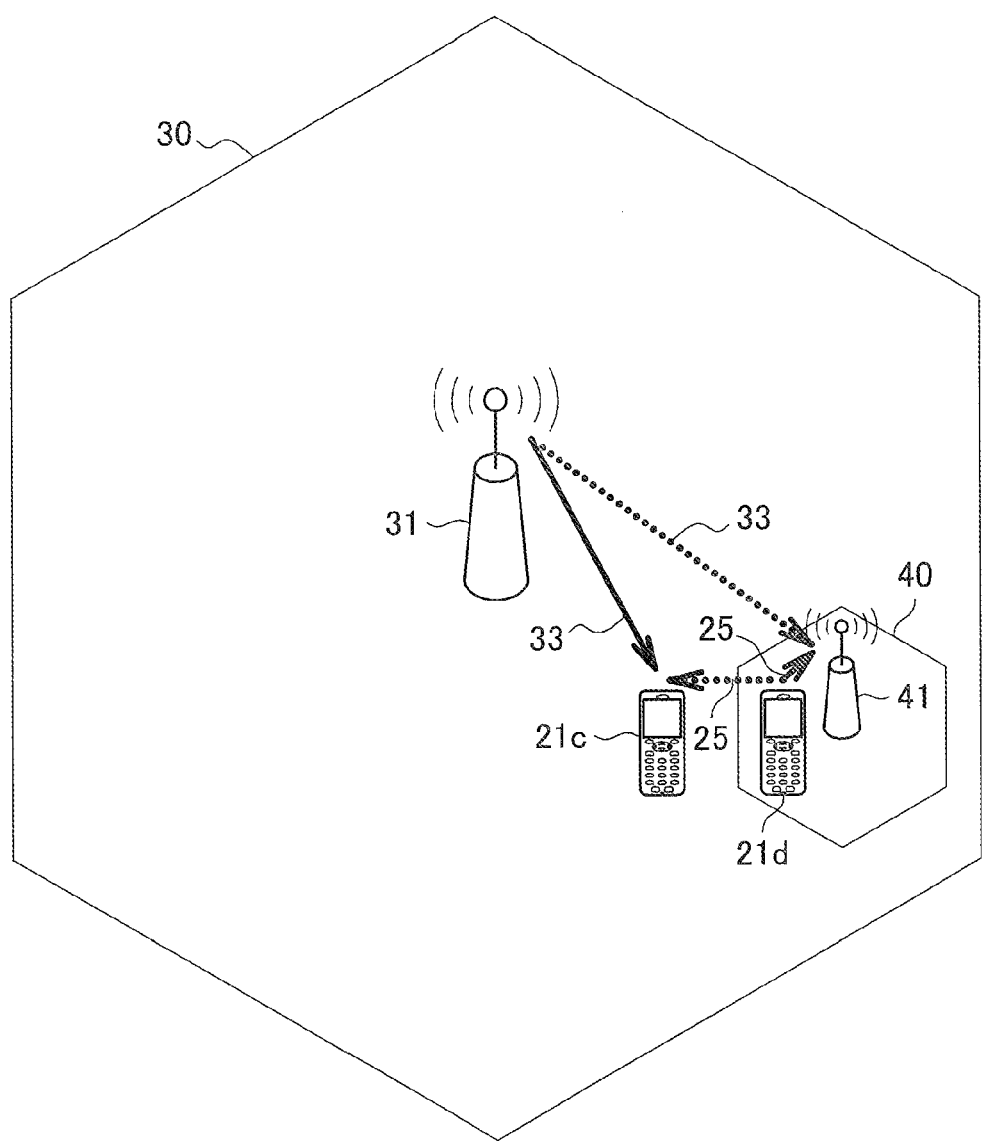
FIG. 5 is a diagram for describing a first example interference in a sub-frame in which a link direction is different between a macrocell and a small cell.

FIG. 5 is a diagram for describing a first example of the interference in a sub-frame in which the link direction is different between a macrocell and a small cell. Referring to FIG. 5, a macrocell 30 and a small cell 40 are shown. The macrocell 30 covers all or part of the small cell 40. Also, in the macrocell 30, there are an eNodeB 31 and a UE 21c. In the small cell 40, there are an eNodeB 41 and a UE 21d. Here, it is assumed that, in some sub-frame, the link direction is the downlink direction in the macrocell 30, and the link direction is the uplink direction in the small cell 40. In this case, when the UE 21c which is receiving a downlink signal 33 from the eNodeB 31 in the macrocell 30 receives an uplink signal 25 from the UE 21d in the small cell 40b, the uplink signal 25 may interfere with the downlink signal 33. Also, when the eNodeB 41 which is receiving the uplink signal 25 from the UE 21d in the small cell 40 receives the downlink signal 33 from the eNodeB 31 in the macrocell 30, the downlink signal 33 may interfere with the uplink signal 25. Specifically, also in FIG. 5, the interfering signals are indicated by a dotted line.

Figure 6:
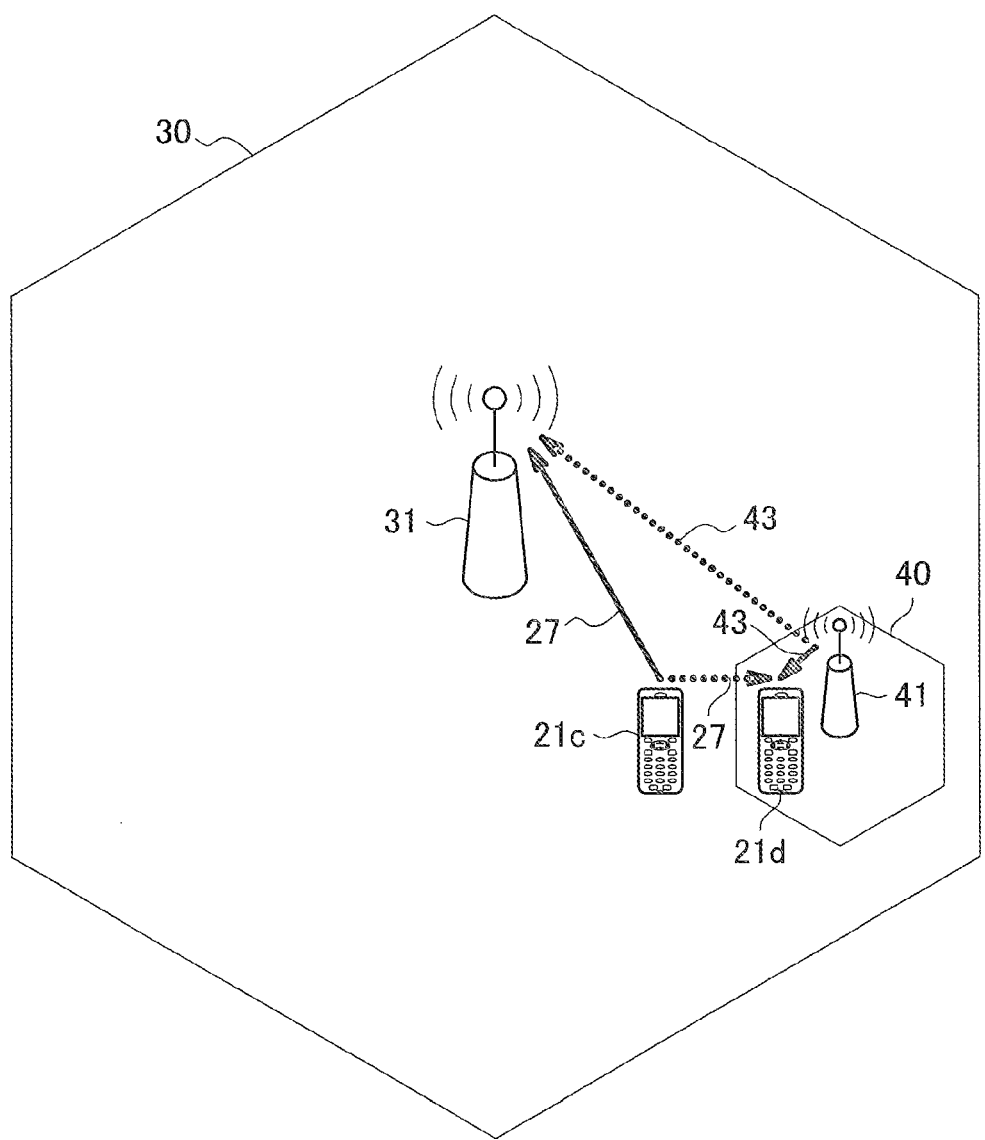
FIG. 6 is a diagram for describing a second example interference in a sub-frame in which a link direction is different between a macrocell and a small cell.

FIG. 6 is a diagram for describing a second example of the interference in a sub-frame in which the link direction is different between a macrocell and a small cell. Referring to FIG. 6, similar to FIG. 5, a macrocell 30 and a small cell 40 are shown. Also, an eNodeB 31, a UE 21c, an eNodeB 41, and a UE 21d are shown. Here, it is assumed that, in some sub-frame, the link direction is the uplink direction in the macrocell 30, and the link direction is the downlink direction in the small cell 40. In this case, when the UE 21d which is receiving a downlink signal 43 from the eNodeB 41 in the small cell 40 receives an uplink signal 27 from the UE 21c in the macrocell 30, the uplink signal 27 may interfere with the downlink signal 43. Also, when the eNodeB 31 which is receiving the uplink signal 27 from the UE 21c in the macrocell 30 receives the downlink signal 43 from the eNodeB 41 in the small cell 40, the downlink signal 43 may interfere with the uplink signal 27. Specifically, also in FIG. 6, the interfering signals are indicated by a dotted line.

Note that the concept of the small cell 40 encompasses a femtocell, nanocell, picocell, microcell, etc. The small cell 40, which is a supplemental cell for increasing the communication capacity of the macrocell 30, may be introduced by providing an eNodeB which is smaller than that of a macrocell.

(Dynamic Change in TDD Configuration)

As described above, interference may occur between related cells when different TDD configurations are set for the related cells, and on the other hand, it is desirable that a TDD configuration should be dynamically set for each cell. This is because an improvement in throughput can be expected by selecting a suitable TDD configuration based on the uplink or downlink traffic rate in each cell. Specifically, when the uplink traffic rate increases in a cell, a TDD configuration including a larger number of uplink sub-frames should be selected based on the increase in the traffic rate. Also, when the downlink traffic rate increases in a cell, a TDD configuration including a larger number of downlink sub-frames should be selected based on the increase in the traffic rate. The characteristics of the traffic rate vary among cells, and therefore, it is desirable that a TDD configuration should be dynamically set for each cell separately. For example, because the radio frame has a length of 10 ms, a TDD configuration may be set every 10 ms to several tens of milliseconds.

(Technical Problem)

As described above, interference may occur between related cells when different TDD configurations are set for the related cells, and on the other hand, it is desirable that the link direction TDD configuration should be dynamically set in order to improve throughput. However, when the TDD configuration is dynamically set for each cell (e.g., every several tens of milliseconds), it is considerably difficult to control the interference between cells.

Therefore, in this embodiment, in a radio communication system employing TDD, the interference between related cells (e.g., between adjacent cells or between a macrocell and a small cell) can be reduced while improving throughput. In the description that follows, specific examples will be given in <2. First Embodiment>, <3. Second Embodiment>, <4. Third Embodiment>, and <5. Fourth Embodiment>.

2. First Embodiment

2. 1. Overview

Firstly, a first embodiment of the present disclosure will be described. In the first embodiment, the link direction is dynamically set for each sub-frame of a first frequency band. The link direction is set for each sub-frame of a second frequency band so that the difference in link direction between adjacent cells is reduced, i.e., as large a number of sub-frames as possible have the same link direction. And, communication resources of the first frequency band are not allocated to a terminal device located in a peripheral portion of a cell. The first embodiment will now be more specifically outlined with respect to FIG. 7.

Figure 7:
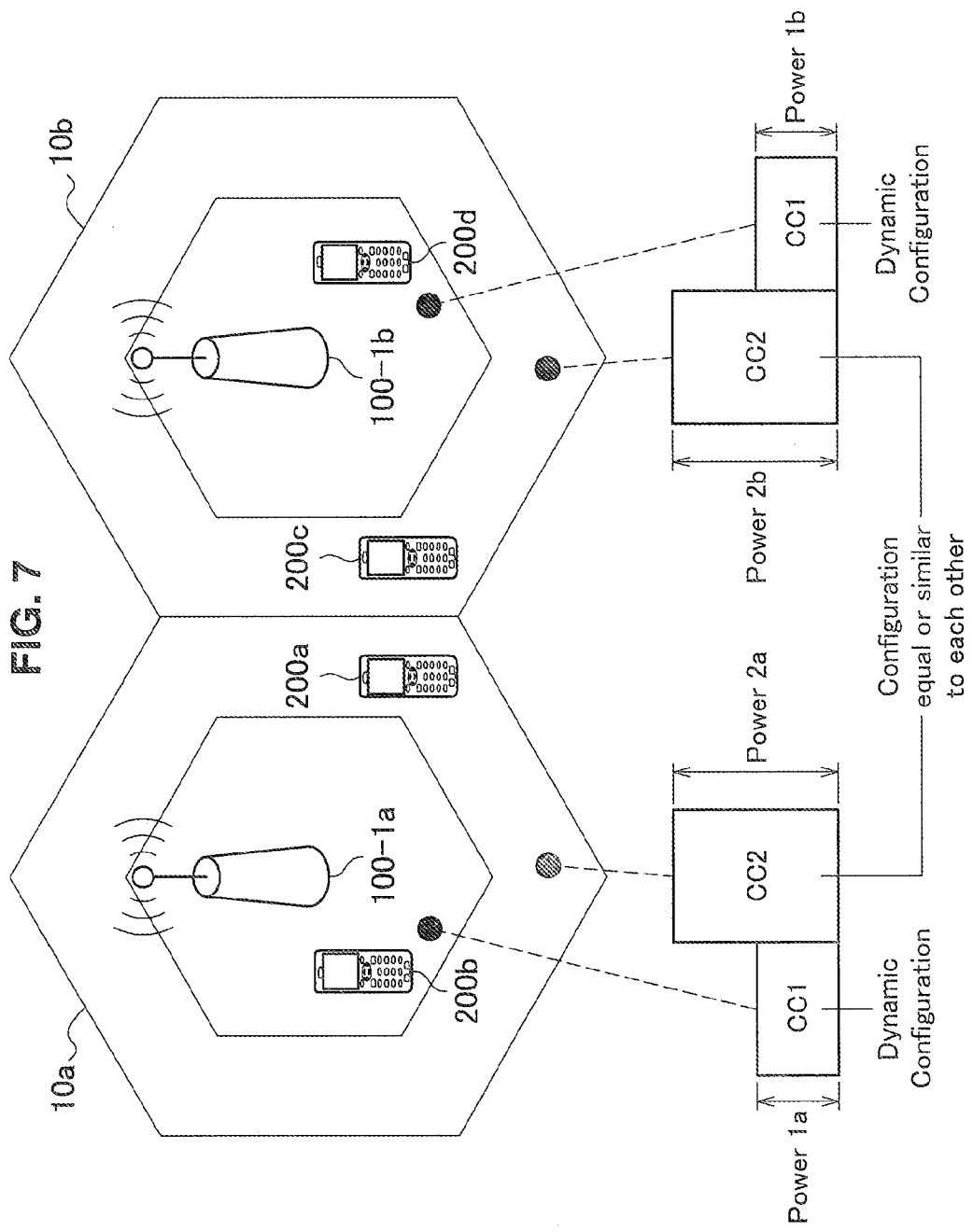
FIG. 7 is a diagram for outlining a first embodiment.

FIG. 7 is a diagram for outlining the first embodiment. Referring to FIG. 7, a cell 10a and a cell 10b adjacent to the cell 10a are shown. In this embodiment, the cell 10 is divided into a peripheral portion which is further from an eNodeB 100-1 and a central portion (i.e., a central portion closer to the eNodeB 100-1) other than the peripheral portion. In the central portion of the cell 10, the TDD configuration is dynamically set. On the other hand, in the peripheral portion of the cell 10, the TDD configuration is set to be equal or similar to that of an adjacent cell. Here, the TDD configuration which is similar to that of an adjacent cell means a TDD configuration in which the number of sub-frames which have a link direction different from that of the configuration of the adjacent cell is small. For example, the configuration 3 and the configuration 4 of FIG. 3 have the same link directions in the sub-frames, except for the sub-frame #4, and therefore, can be said to be similar to each other. Also, for example, in the peripheral portion of the cell 10, the TDD configuration may be statically or quasi-statically set.

In typical LTE, different TDD configurations cannot be used in a single frequency band (i.e., a single component carrier (CC) of 20 MHz), and therefore, the carrier aggregation technique is used. Carrier aggregation is a technique of aggregating a plurality of CCs, thereby improving total throughput. For example, when the plurality of CCs include a CC 1 and a CC 2, the CC 1 is used as communication resources for a UE 200 which is located in the central portion of the cell 10, and the CC 2 is used as communication resources for a UE 200 which is located in the peripheral portion (and the central portion) of the cell 10. For the CC 1, the TDD configuration is dynamically set based on the traffic rate in the cell. For the CC 2, the TDD configuration is set (e.g., statically or quasi-statically) to be equal or similar to that of an adjacent cell.

By thus setting the TDD configuration and allocating communication resources, communication resources of a frequency band in which the link direction is dynamically set are allocated only to a UE 200 which is located in the central portion of the cell 10. Therefore, as described below, transmission power of the communication resources can be reduced. As a result, an uplink signal on the communication resources does not substantially interfere with a downlink signal of an adjacent cell, and a downlink signal on the communication resources does not substantially interfere with an uplink signal of an adjacent cell. Specifically, in a frequency band in which the link direction is dynamically set, interference such as that shown in FIG. 4 does not substantially occur. Note that only communication resources of a frequency band in which the difference in link direction from an adjacent cell is small are allocated to a UE 200 which is located in the peripheral portion of the cell 10. Therefore, of course, in the frequency band, interference such as that shown in FIG. 4 does not substantially occur. Therefore, in a radio communication system employing TDD, by dynamically setting the link direction, interference between adjacent cells can be reduced while improving throughput.

Note that the eNodeB 100-1 allocates small transmission power (e.g., power 1) to downlink in the CC 1, and large transmission power (e.g., power 2) to downlink in the CC 2. Also, the eNodeB 100-1 allocates small transmission power (e.g., the power 1) to uplink in the CC 1 for a UE 200 which is located in the central portion of the cell 10 and for which communication resources of the CC 1 are allocated to uplink. Also, the eNodeB 100-1 allocates large transmission power (e.g., the power 2) to uplink in the CC 2 for a UE 200 which is located in the peripheral portion of the cell 10 and for which communication resources of the CC 2 are allocated to uplink. This is because transmission power may be small when the distance between the eNodeB 100-1 and a UE 200 is small, and transmission power needs to be large when the distance is large. The allocation of the power makes it difficult for a downlink signal and uplink signal of the CC 1 for the central portion of the cell 10a to reach the central portion of the adjacent cell 10b. Therefore, as described above, the interference which occurs because different TDD configurations are dynamically set for different cells is reduced.

2. 2. Configuration of eNodeB

An example configuration of the eNodeB 100-1 of the first embodiment will be described with reference to FIG. 8.

Figure 8:
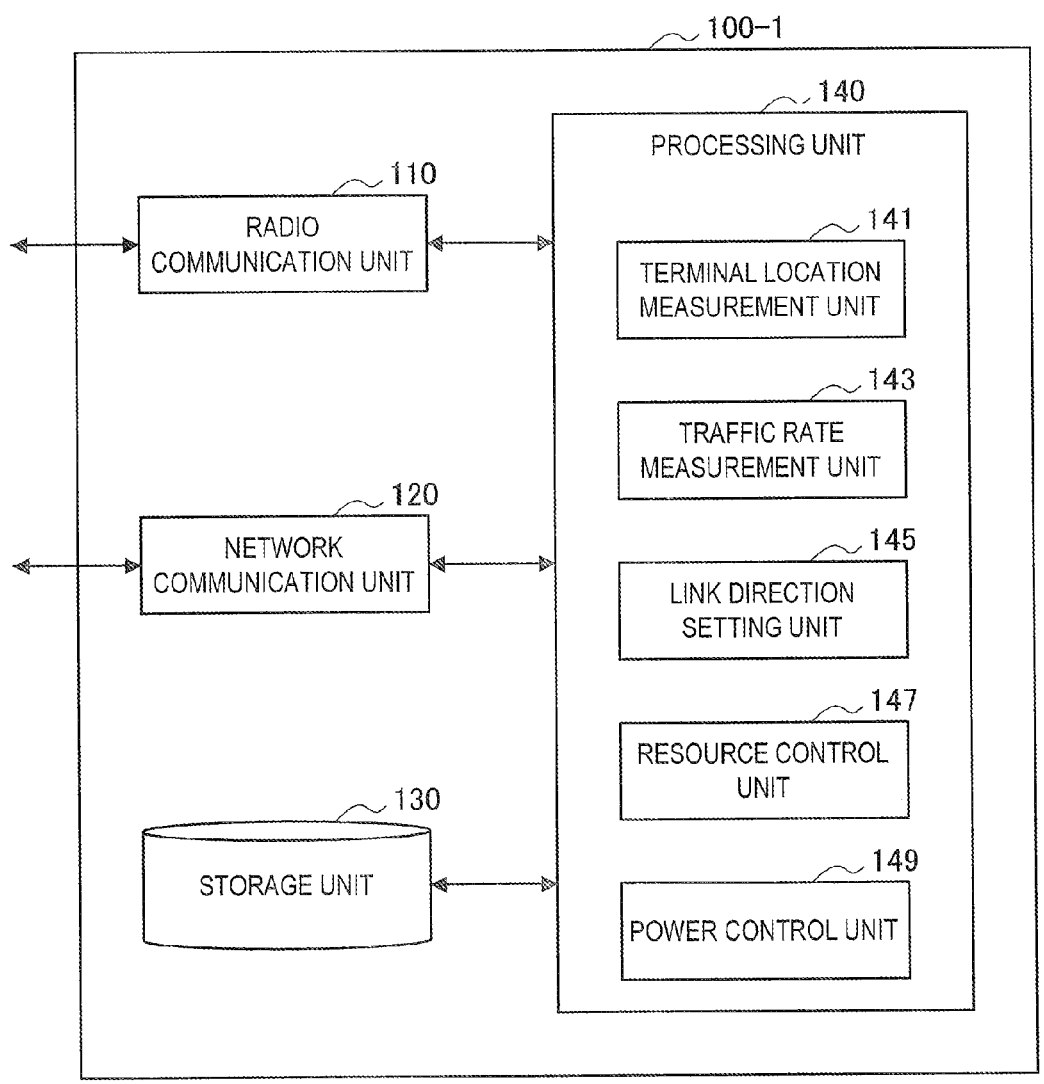
FIG. 8 is a block diagram showing an example configuration of an eNodeB according to the first embodiment.

FIG. 8 is a block diagram showing the example configuration of the eNodeB 100-1 of the first embodiment. Referring to FIG. 8, the eNodeB 100-1 includes a radio communication unit 110, a network communication unit 120, a storage unit 130, and a processing unit 140.

(Radio Communication Unit 110)

The radio communication unit 110 communicates with one or more UEs 200 in the cell 10 over a channel in which the link direction can be dynamically set for each sub-frame which is a unit of time in radio communication. The channel includes, for example, at least a first frequency band and a second frequency band. The first frequency band and the second frequency band are each a component carrier. Specifically, the radio communication unit 110 communicates with a UE 200 in the cell 10 on the CC 1 and CC 2 in which the link direction can be dynamically set for each sub-frame. Also, the radio communication unit 110 transmits a downlink signal to a UE 200 in the cell 10 and receives an uplink signal from a UE 200 in the cell 10 according to allocation of resources. Note that the radio communication unit 110 includes, for example, an antenna and an RF circuit.

(Network Communication Unit 120)

The network communication unit 120 communicates with communication nodes including other eNodeBs. For example, the X2 interface between eNodeBs may be implemented via the network communication unit 120. The network communication unit 120 may include a radio communication module which may be shared by the radio communication unit 110, or a wired communication module, such as a LAN-connected terminal etc.

(Storage Unit 130)

The storage unit 130 stores a program and data for operation of the eNodeB 100-1. The storage unit 130 includes, for example, a medium, such as a hard disk, a semiconductor memory, etc.

(Processing Unit 140)

The processing unit 140 provides various functions of the eNodeB 100-1. For example, the processing unit 140, which corresponds to a processor, such as a CPU (Central Processing Unit), a DSP (Digital Signal Processor), etc., executes a program stored in the storage unit 130 or another storage medium to provide the various functions. The processing unit 140 includes a terminal location measurement unit 141, a traffic rate measurement unit 143, a link direction setting unit 145, a resource control unit 147, and a power control unit 149.

(Terminal Location Measurement Unit 141)

The terminal location measurement unit 141 measures a location of a UE 200 in the cell 10. The location is, for example, represented by a distance between the eNodeB 100-1 and the UE 200. For example, the terminal location measurement unit 141 measures the distance between the eNodeB 100-1 and the UE 200 based on a timing advance value for each UE 200.

(Traffic Rate Measurement Unit 143)

The traffic rate measurement unit 143 measures an uplink traffic rate and a downlink traffic rate in the cell 10. The traffic rate measurement unit 143 may measure an actual value of the traffic rate during a predetermined period of time, or may measure an estimated value of the traffic rate which is predicted to occur during a predetermined period of time based on a scheduling request from a UE 200 etc. Also, the traffic rate measurement unit 143 may measure the traffic rate in the peripheral portion of the cell 10 and the traffic rate in the central portion of the cell 10 separately, or measure the overall traffic rate without distinguishing between these transfer rates.

(Link Direction Setting Unit 145)

The link direction setting unit 145 dynamically sets the link direction for each sub-frame of the first frequency band, and sets the link direction for each sub-frame of the second frequency band so that the difference in link direction between the cell 10 and a cell related to the cell 10 is reduced. In this embodiment, the related cell is a cell adjacent to the cell 10. For example, the link direction setting unit 145 dynamically sets the TDD configuration of the CC 1 based on the uplink or downlink traffic rate. As an example, the TDD configuration of the CC 1 is set every 10 ms to several tens of milliseconds. Also, the link direction setting unit 145 sets the TDD configuration of the CC 2 to be equal or similar to the TDD configuration of the CC 2 of an adjacent cell. As an example, the link direction setting unit 145 negotiates with the eNodeB 100-1 of the adjacent cell, through the network communication unit 120, as to the setting of the link direction of the CC 2, based on the measured traffic rate. The interface between the eNodeB 100-1 of the cell 10 and the eNodeB 100-1 of the adjacent cell is the X2 interface.

Also, the link direction setting unit 145 statically or quasi-statically sets the link direction for each sub-frame of the second frequency band. For example, the link direction setting unit 145 statically or quasi-statically sets the TDD configuration of the CC 2. As an example, the link direction setting unit 145 sets the TDD configuration of the CC 2 each time a predetermined period of time has passed. The predetermined period of time is longer than the interval of the setting of the CC 1. By thus setting statically or quasi-statically, the communication and process for adjusting the TDD configuration between eNodeBs can be minimized.

(Resource Control Unit 147)

The resource control unit 147 controls allocation of communication resources to a UE 200 based on the setting of the link direction of the channel in which the link direction can be dynamically set for each sub-frame, and the location of the UE 200 in the cell 10. In particular, in this embodiment, the resource control unit 147 does not allocate communication resources of the first frequency band to a UE 200 which is located in the peripheral portion of the cell 10. For example, the resource control unit 147 does not allocate communication resources of the CC 1 to a UE 200 which is located in the peripheral portion of the cell 10, and allocates communication resources of the CC 1 to a UE 200 which is not located in the peripheral portion of the cell 10 (i.e., a UE 200 which is located in the central portion of the cell 10). Also, for example, the resource control unit 147 allocates communication resources of the CC 2 to a UE 200 which is located in the peripheral portion of the cell 10 (and the central portion of the cell 10).

(Power Control Unit 149)

The power control unit 149 controls transmission power in the cell 10. For example, the power control unit 149 controls transmission power of the radio communication unit 110. For example, the power control unit 149 allocates small transmission power to downlink in the first frequency band (e.g., the CC 1), and large transmission power to downlink in the second frequency band (e.g., the CC 2).

Also, for example, the eNodeB 100-1 allocates small transmission power to uplink in the first frequency band for a UE 200 which is located in the central portion of the cell 10 and for which communication resources of the first frequency band (e.g., the CC 1) are allocated to uplink. Also, the eNodeB 100-1 allocates large transmission power to uplink in the second frequency band for a UE 200 which is located in the peripheral portion of the cell 10 and for which communication resources of the second frequency band (e.g., the CC 2) are allocated to uplink.

2. 3. Configuration of UE

Figure 9:
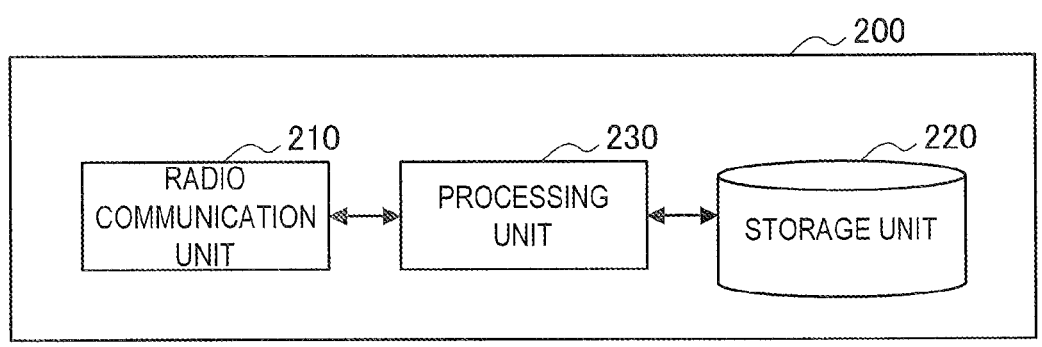
FIG. 9 is a block diagram showing an example configuration of a UE according to the first embodiment.

An example configuration of the UE 200 of the first embodiment will be described with reference to FIG. 9. FIG. 9 is a block diagram showing the example configuration of the UE 200 of the first embodiment. Referring to FIG. 9, the UE 200 includes a radio communication unit 210, a storage unit 220, and a processing unit 230.

(Radio Communication Unit 210)

The radio communication unit 210 communicates with the eNodeB 100-1 in the cell 10 over a channel in which the link direction can be dynamically set for each sub-frame which is a unit of time in radio communication. Also, the radio communication unit 210 communicates with the eNodeB 100-1 according to allocation of communication resources to the radio communication unit 210 itself which is performed by the eNodeB 100-1 based on the setting of the link direction of the channel and the location of the radio communication unit 210 itself in the cell 10.

For example, the channel includes at least a first frequency band and a second frequency band. And, the first frequency band and the second frequency band are each a component carrier. Specifically, the radio communication unit 210 communicates with the eNodeB 100-1 in the cell 10 on the CC 1 and CC 2 in which the link direction can be dynamically set for each sub-frame. Also, the eNodeB 100-1 allocates communication resources to the UE 200 based on the settings of the TDD configurations of the CC 1 and CC 2 and the location of the UE 200 in the cell 10, and therefore, the radio communication unit 210 communicates according to the allocation of communication resources. Note that the radio communication unit 110 includes, for example, an antenna and an RF circuit.

(Storage Unit 220)

The storage unit 220 stores a program and data for operation of the UE 200. The storage unit 220 includes a storage medium, such as a hard disk, a semiconductor memory, etc.

(Processing Unit 230)

The processing unit 230 provides various functions of the UE 200. For example, the processing unit 230, which corresponds to a processor, such as a CPU (Central Processing Unit), a DSP (Digital Signal Processor), etc., executes a program stored in the storage unit 220 or another storage medium to provide the various functions. As an example, the processing unit 230 controls communication of the radio communication unit 210.

For example, the processing unit 230 obtains system information from a downlink signal received by the radio communication unit 210. Also, the processing unit 230 recognizes the TDD configuration which has been set from the system information. For example, system information of each CC is obtained from the downlink signal of the CC, and the TDD configuration of each CC is recognized from the system information of the CC. Thereafter, the processing unit 230 causes the radio communication unit 210 to communicate based on the recognized TDD configurations.

Also, for example, the processing unit 230 obtains scheduling information of uplink and downlink from a downlink signal received by the radio communication unit 210. Also, the processing unit 230 recognizes allocation of communication resources to the UE 200 from the scheduling information. Thereafter, the processing unit 230 causes the radio communication unit 210 to communicate according to the allocation of communication resources.

2. 4. Flow of Process

Figure 10:
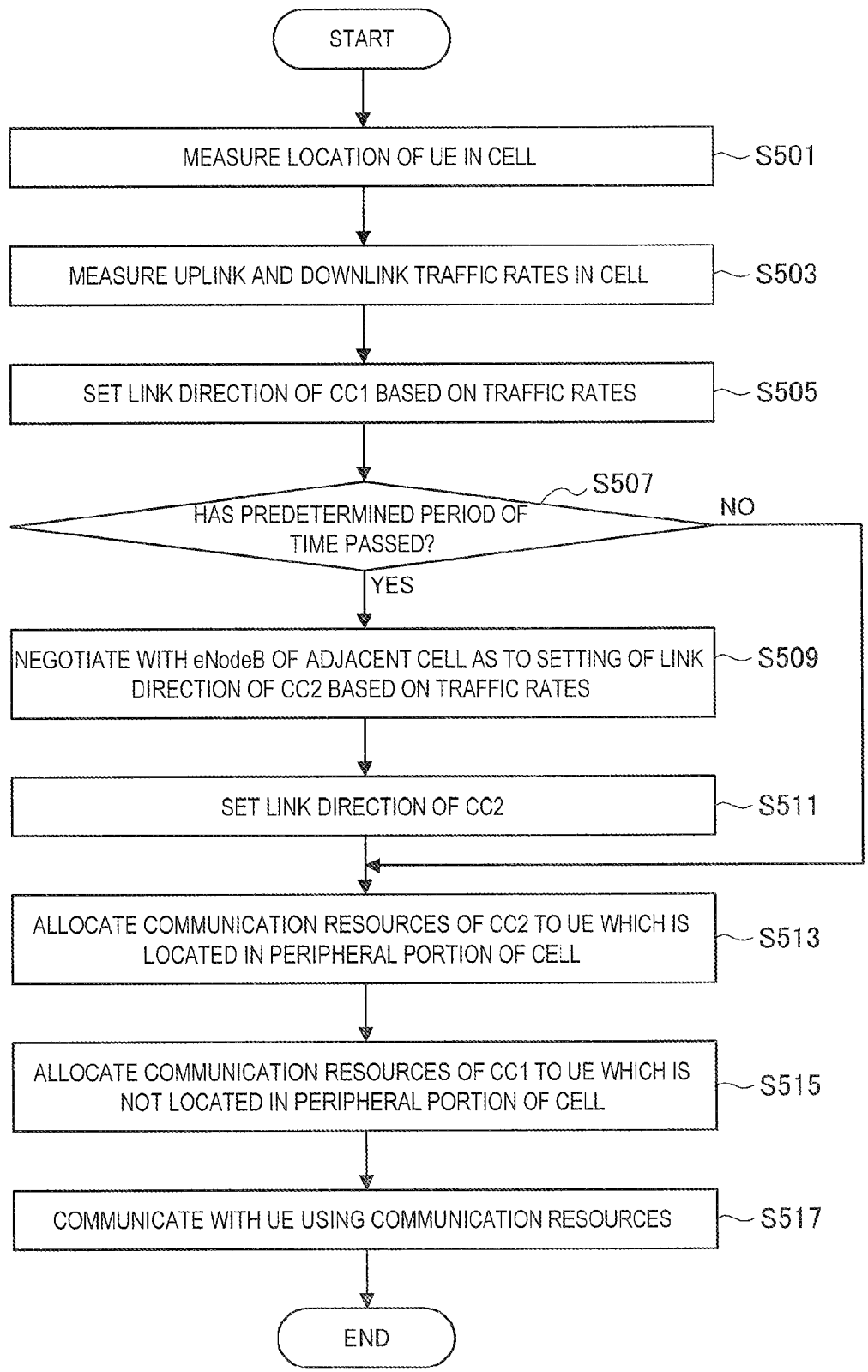
FIG. 10 is a flowchart showing an example schematic flow of a communication control process according to the first embodiment.

Next, an example communication control process according to the first embodiment will be described with reference to FIG. 10. FIG. 10 is a flowchart showing an example schematic flow of the communication control process of the first embodiment. Note that the communication control process is a process in the eNodeB 100-1.

Initially, in step S501, the terminal location measurement unit 141 measures the location of a UE 200 in the cell 10. In step S503, the traffic rate measurement unit 143 measures the uplink traffic rate and the downlink traffic rate in the cell 10. Thereafter, in step S505, the link direction setting unit 145 sets the link direction (e.g., the TDD configuration) of the CC 1 based on the measured traffic rates.

In step S507, the link direction setting unit 145 determines whether or not a predetermined period of time has passed. If the predetermined period of time has passed, control proceeds to step S509. Otherwise, control proceeds to step S513.

In step S509, the link direction setting unit 145 negotiates with the eNodeB 100-1 of an adjacent cell, through the network communication unit 120, as to the setting of the link direction of the CC 2, based on the measured traffic rates. Thereafter, in step S511, the link direction setting unit 145 sets the link direction (i.e., the TDD configuration) of the CC 2 based on the result of the negotiation with the eNodeB 100-1 of the adjacent cell.

In step S513, the resource control unit 147 allocates communication resources of the CC 2 to a UE 200 which is located in the peripheral portion of the cell 10 (and the central portion of the cell 10). In step S515, the resource control unit 147 allocates communication resources of the CC 1 to a UE 200 which is not located in the peripheral portion of the cell 10 (i.e., a UE 200 which is located in the central portion of the cell 10).

In step S517, the radio communication unit 110 communicates with the UE 200 using the allocated communication resources.

2. 5. Variations (1) Overview

Next, a variation of the first embodiment will be described. In this variation, the cell 10 is a macrocell which covers all or part of a small cell. The eNodeB 100-1 causes a communication node (e.g., an eNodeB) of the small cell to set the link direction for each sub-frame in the small cell so that the difference in link direction between the cell 10 and the small cell is reduced. Such a variation of the first embodiment will now be more specifically outlined with reference to FIG. 11.

Figure 11:
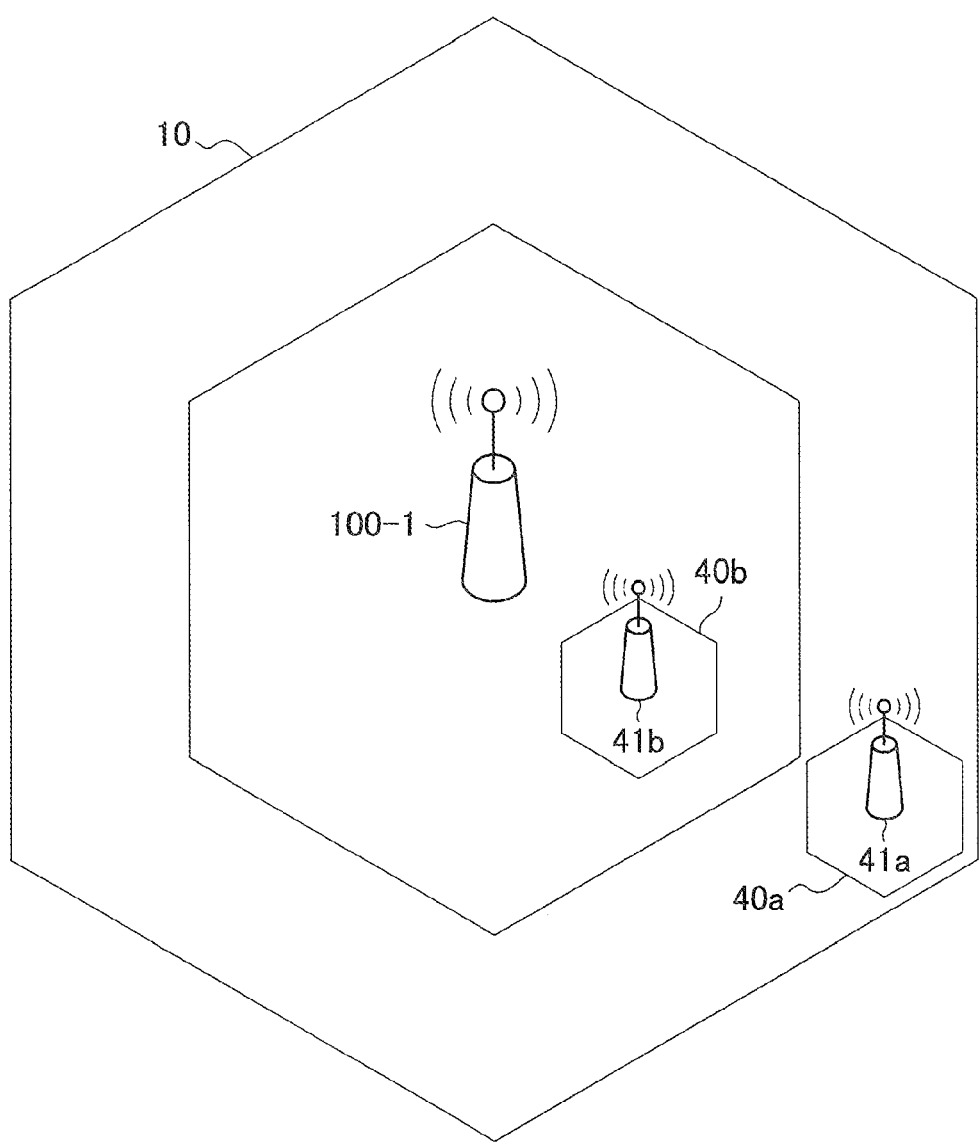
FIG. 11 is a diagram for outlining a variation of the first embodiment.

FIG. 11 is a diagram for outlining the variation of the first embodiment. Referring to FIG. 11, a cell 10 which is a macrocell and two small cells 40 are shown. The cell 10 is similar to that which has been described with reference to FIG. 7. Specifically, in the cell 10, the CC 1 is used as communication resources for a UE 200 which is located in the central portion of the cell 10, and the CC 2 is used as communication resources for a UE 200 which is located in the peripheral portion (and the central portion) of the cell 10. The small cell 40a is located in the peripheral portion of the cell 10, and the small cell 40b is located in the central portion of the cell 10.

In such a case, for example, the eNodeB 100-1 causes an eNodeB 41a to set the TDD configuration of the CC 2 of the small cell 40a to be equal or similar to the TDD configuration of the CC 2 of the cell 10. Also, the eNodeB 100-1 causes an eNodeB 41b to set the TDD configuration of the CC 1 of the small cell 40b to be equal or similar to the TDD configuration of the CC 1 of the cell 10.

By thus setting the TDD configuration, the link direction of the cell 10 which is a macrocell is equal to the link direction of the small cell 40 in most of the sub-frames. Therefore, the interference described with reference to FIGS. 5 and 6 can be reduced.

(Variation of Small Cell)

Note that, similar to the cell 10, the small cell 40 may be divided into a peripheral portion which is further from the eNodeB 41 and a central portion (i.e., a central portion closer to the eNodeB 41) other than the peripheral portion. This will now be more specifically described with reference to FIG. 12.

Figure 12:
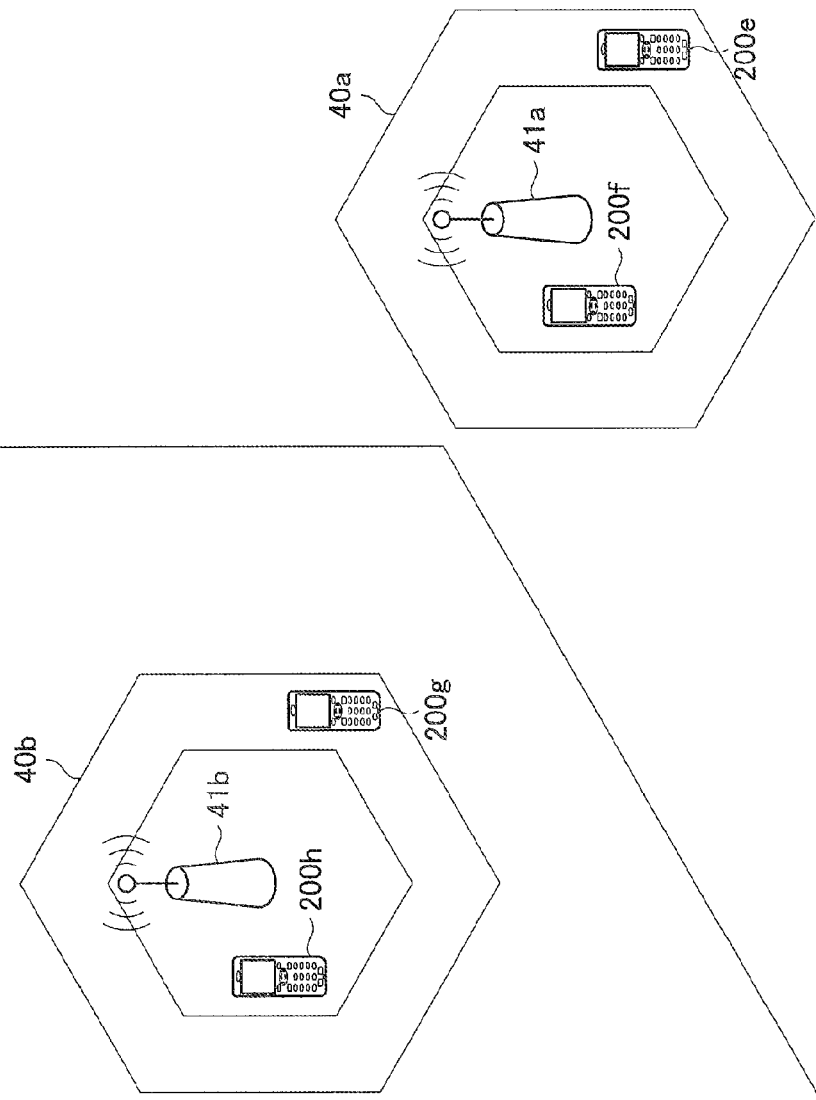
FIG. 12 is a diagram for describing operations of an eNodeB and a UE in a small cell.

FIG. 12 is a diagram for describing operations of the eNodeB 41 and a UE 200 in the small cell 40. Referring to FIG. 12, the small cells 40a and 40b shown in FIG. 11 are also shown. In this case, the eNodeB 41a of the small cell 40a dynamically sets the link direction for each sub-frame of a CC which is different from the CC 2, and does not allocate communication resources of the different frequency band to an UE 200e which is located in the peripheral portion of the small cell 40a. The eNodeB 41a allocates communication resources of the different frequency band to a UE 200f which is located in the central portion of the small cell 40a. Also, the eNodeB 41b of the small cell 40b dynamically sets the link direction for each sub-frame of a CC other than the CC 1, and does not allocate communication resources of the different frequency band to a UE 200g which is located in the peripheral portion of the small cell 40b. The eNodeB 41b allocates communication resources of the different frequency band to a UE 200h which is located in the central portion of the small cell 40b.

By thus allocating resources, communication resources of a frequency band for which the link direction is dynamically set (i.e., the different frequency band) are allocated only to a UE 200 which is located in the central portion of the small cell 40. Therefore, in the small cell, transmission power of the communication resources can be reduced. As a result, an uplink signal on the communication resources of the small cell does not substantially interfere with a downlink signal of the cell 10, and a downlink signal on the communication resources of the small cell does not substantially interfere with an uplink signal of the macrocell. Specifically, in a frequency band for which the link direction is dynamically set, interference of a small cell with a macrocell, such as those shown in FIGS. 5 and 6, does not substantially occur.

Moreover, the distance between a UE 200 which is located in the central portion of the small cell 40, and the eNodeB 41, is smaller than the distance between the eNodeB 100-1 and the eNodeB 41, and therefore, a downlink signal of the cell 10 does not substantially interfere with an uplink signal of the small cell 40. Also, the distance between a UE 200 which is located in the central portion of the small cell 40, and the eNodeB 41, is smaller than the distance between the UE 200 and another UE 200 which communicates with the eNodeB 100-1, and therefore, an uplink signal of the cell 10 does not substantially interfere with a downlink signal of the small cell 40. Specifically, in a frequency band for which the link direction is dynamically set, interference of a small cell with a macrocell, such as those shown in FIGS. 5 and 6, does not substantially occur.

Note that, in the small cell 40, only communication resources of a frequency band (the CC 1 or the CC 2) for which the difference in link direction from the cell 10 is small are allocated to a UE 200 which is located in the peripheral portion of the small cell 40. Therefore, in the frequency band, interference, such as those shown in FIGS. 5 and 6, does not substantially occur.

Therefore, in a radio communication system employing TDD, by dynamically setting the link direction, interference between a macrocell and a small cell can be reduced while improving throughput.

(2) Configuration of eNodeB

In this variation, the link direction setting unit 145 and the power control unit 149 of the eNodeB 100-1 which have been described with reference to FIG. 8 further operate as follows. Note that, as described above, in this variation, the cell 10 is a macrocell which covers all or part of the small cell 40.

(Link Direction Setting Unit 145)

The link direction setting unit 145 causes the eNodeB 41 in the small cell 40 to set the link direction for each sub-frame in the small cell 40 so that the difference in link direction between the cell 10 and the small cell 40 is reduced. Specifically, the link direction setting unit 145 causes the eNodeB 41 to set the TDD configuration of the small cell 40 to be equal or similar to the TDD configuration of the cell 10.

For example, the link direction setting unit 145, when the small cell 40 is located in the peripheral portion of the cell 10, causes the eNodeB 41 to set the link direction of the second frequency band in the small cell 40 so that the difference in link direction between the cell 10 and the small cell 40 is reduced. Specifically, the link direction setting unit 145 causes the eNodeB 41a to set the TDD configuration of the CC 2 in the small cell 40a to be equal or similar to the TDD configuration of the CC 2 of the cell 10. In this case, for example, similar to the TDD configuration of the CC 2 of the cell 10, the TDD configuration of the CC 2 in the small cell 40a is statically or quasi-statically set.

Also, for example, the link direction setting unit 145, when the small cell 40 is not located in the peripheral portion of the cell 10, causes the eNodeB 41 to set the the link direction of the first frequency band in the small cell 40 so that the difference in link direction between the cell 10 and the small cell 40 is reduced. Specifically, the link direction setting unit 145 causes the eNodeB 41b to set the TDD configuration of the CC 1 in the small cell 40b to be equal or similar to the TDD configuration of the CC 1 of the cell 10. In this case, for example, similar to the TDD configuration of the CC 1 of the cell 10, the TDD configuration of the CC 1 in the small cell 40b is dynamically set.

As a specific technique of controlling the eNodeB 41, the link direction setting unit 145 notifies the eNodeB 41 of the link direction for each sub-frame of the first frequency band or the link direction for each sub-frame of the second frequency band, which has been set by the link direction setting unit 145. As a result, the link direction setting unit 145 causes the eNodeB 41 to set the link direction for each sub-frame in the small cell 40. The link direction setting unit 145 performs the notification of the eNodeB 41, for example, through the network communication unit 120.

Note that, as described above with reference to FIG. 12, the eNodeB 41, when the small cell 40 is located in the peripheral portion of the cell 10, may dynamically set the link direction for each sub-frame of a frequency band which is different from the second frequency band, and may not allocate communication resources of the different frequency band to a UE 200 which is not located in the peripheral portion of the small cell 40. Specifically, the eNodeB 41 may dynamically set the TDD configuration of a CC which is different from the CC 2, and may not allocate communication resources of the different CC to a UE 200e which is located in the peripheral portion of the small cell 40a.

Similarly, as described above with reference to FIG. 12, the eNodeB 41, when the small cell 40 is not located in the peripheral portion of the cell 10, may dynamically set the link direction for each sub-frame of a frequency band which is different from the first frequency band, and may not allocate communication resources of the different frequency band to a terminal device which is located in the peripheral portion of the small cell 40. Specifically, the eNodeB 41 may dynamically set the TDD configuration of a CC which is different from the CC 1, and may not allocate communication resources of the different CC to a UE 200g which is located in the peripheral portion of the small cell 40b.

(Power Control Unit 149)

The power control unit 149 may reduce transmission power in the cell 10 for a sub-frame in which the link direction in the cell 10 is different from the link direction in the small cell 40. For example, the power control unit 149 reduces transmission power of the CC 2 in the cell 10 for a sub-frame in which the link direction of the CC 2 in the cell 10 is different from the link direction of the CC 2 in the small cell 40a. Also, for example, the power control unit 149 reduces transmission power of the CC 1 in the cell 10 for a sub-frame in which the link direction of the CC 1 in the cell 10 is different from the link direction of the CC 1 in the small cell 40b. In this case, for example, the power control unit 149 is notified of the link direction (i.e., the TDD configuration) in the small cell 40, by the eNodeB 41 through the network communication unit 120.

By thus reducing transmission power, interference of a downlink signal of the cell 10 with an uplink signal of the small cell 40, and interference of an uplink signal of the cell 10 with a downlink signal of the small cell 40, can be reduced.

(Others)

Note that if the number of sub-frames which can be used in communication in the small cell 40 is limited, sub-frames to be used in communication may be selected based on the downlink or uplink traffic rate in the small cell 40. Specifically, the ratio of uplink sub-frames and downlink sub-frames in a radio frame may be changed, depending on the downlink or uplink traffic rate. This will now be specifically described with reference to FIG. 13.

Figure 13:
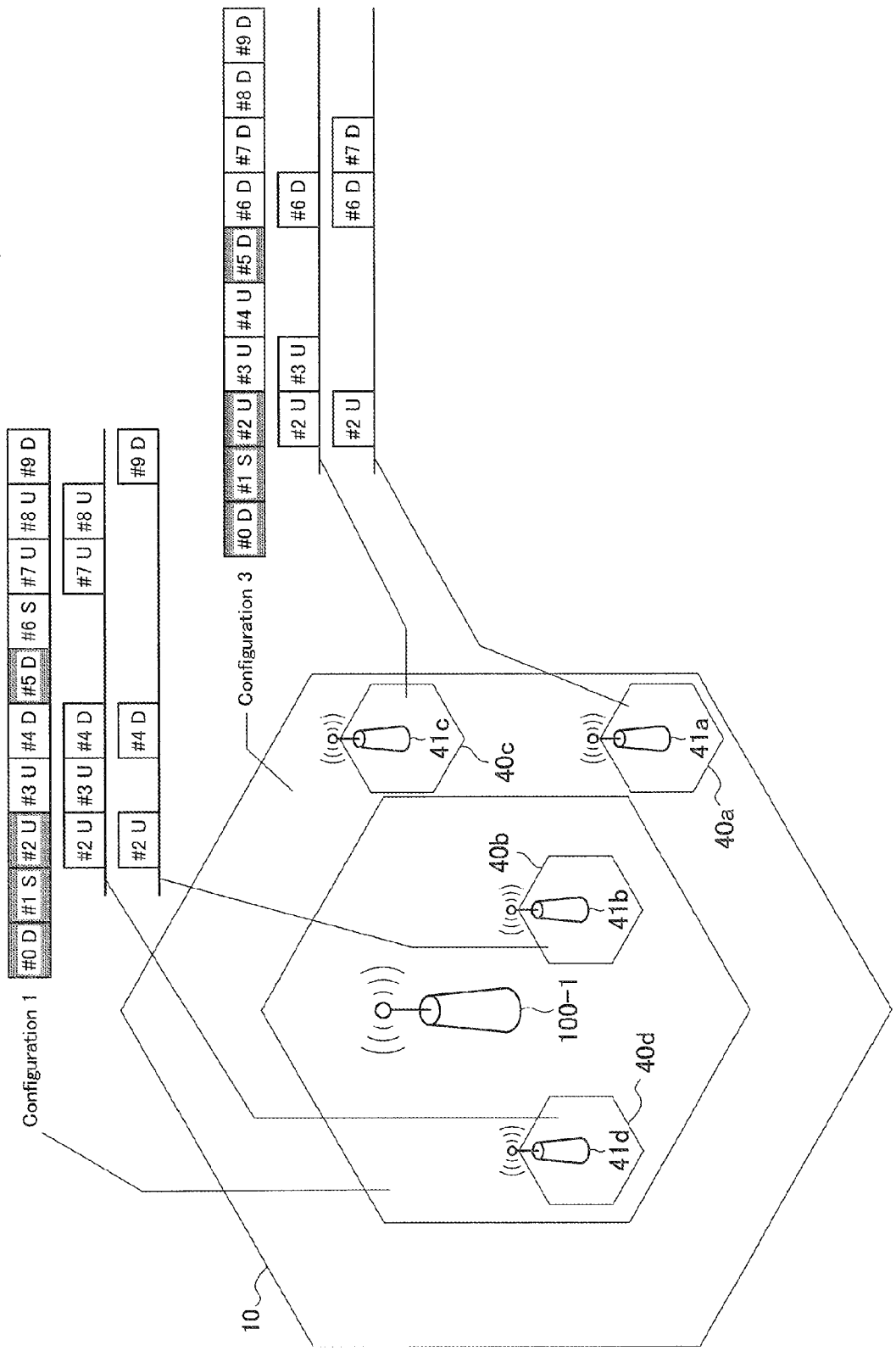
FIG. 13 is a diagram for describing example selection of sub-frames used in communication in a small cell.

FIG. 13 is a diagram for describing example selection of sub-frames used in communication in a small cell. Referring to FIG. 13, a CC 1 which is used as communication resources for a UE 200 which is located in the central portion of a cell 10 is set to have a TDD configuration corresponding to the configuration 1 of FIG. 3. Also, a CC 2 which is used as communication resources for a UE 200 which is located in the peripheral portion of the cell 10 is set to have a TDD configuration corresponding to the configuration 3 of FIG. 3.

In a small cell 40a which is located in the peripheral portion of the cell 10, the downlink traffic rate is higher than the uplink traffic rate, and therefore, a larger number of downlink sub-frames are selected as sub-frames to be used in communication. On the other hand, in a small cell 40c which is located in the peripheral portion of the cell 10, the uplink traffic rate is higher than the downlink traffic rate, and therefore, a larger number of uplink sub-frames are selected as sub-frames to be used in communication.

Similarly, in a small cell 40b which is located in the central portion of the cell 10, the downlink traffic rate is higher than the uplink traffic rate, and therefore, a larger number of downlink sub-frames are selected as sub-frames to be used in communication. On the other hand, in a small cell 40d which is located in the central portion of the cell 10, the uplink traffic rate is higher than the downlink traffic rate, and therefore, a larger number of uplink sub-frames are selected as sub-frames to be used in communication.

(3) Flow of Process

Figure 14:
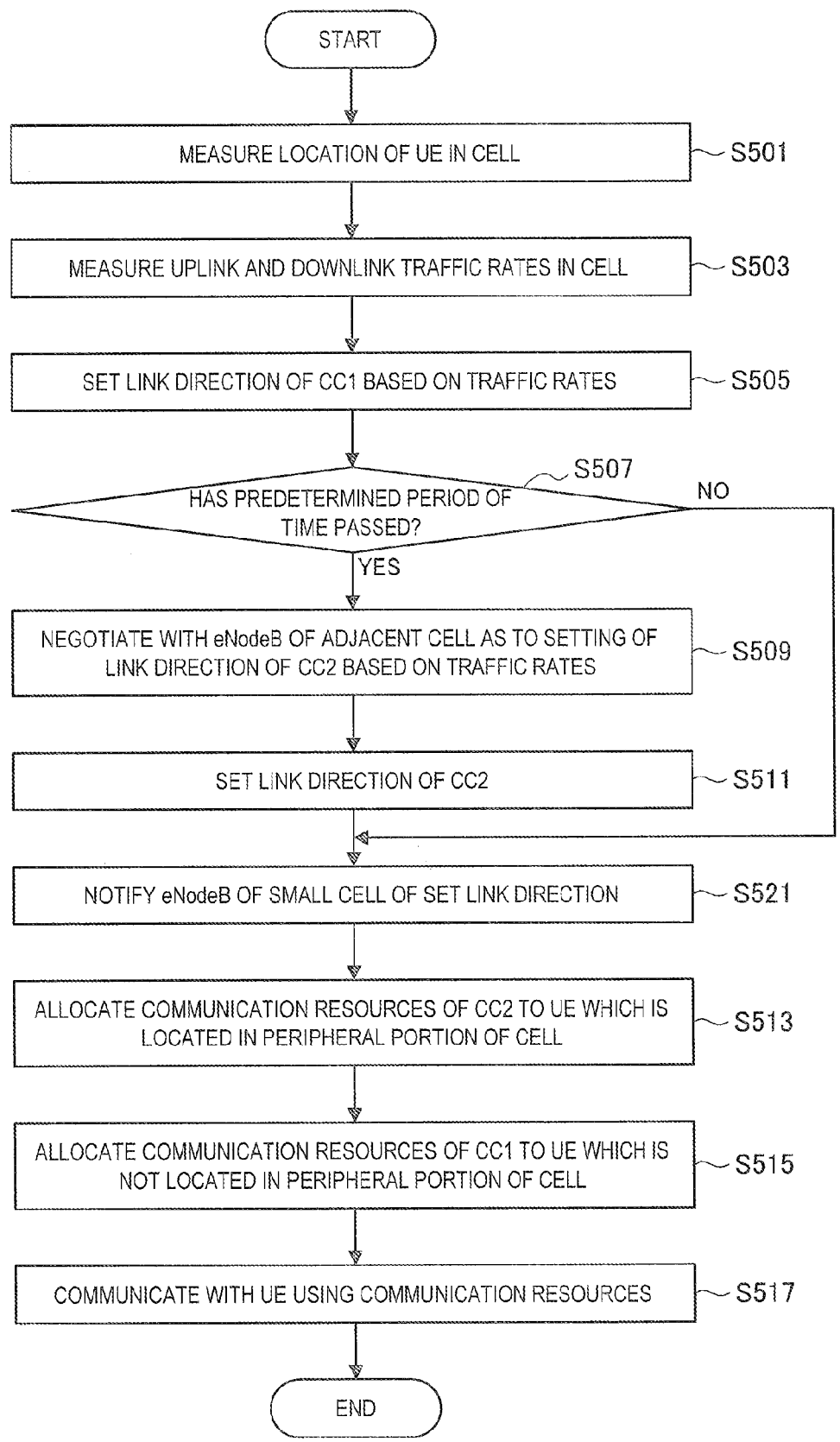
FIG. 14 is a flowchart showing an example schematic flow of a communication control process according to a variation of the first embodiment.

Next, an example communication control process according to a variation of the first embodiment will be described with reference to FIG. 14. FIG. 14 is a flowchart showing an example schematic flow of the communication control process of the variation of the first embodiment. The communication control process is a process in an eNodeB 100-1. Here, only step S521 will be described which is the difference between the example communication control process of the first embodiment described with reference to FIG. 10 and the example communication control process of the variation.

In step S521, the link direction setting unit 145 notifies an eNodeB 41 of the link direction for each sub-frame of the CC 1 or the link direction for each sub-frame of the CC 2, that has been set by the link direction setting unit 145. As a result, the link direction setting unit 145 causes the eNodeB 41 to set the link direction for each sub-frame in the small cell 40. The link direction setting unit 145 performs the notification of the eNodeB 41, for example, through the network communication unit 120.

3. Second Embodiment 3. 1. Overview

The first embodiment has been particularly described with reference to an operation of an eNodeB in a cell adjacent to another cell. Moreover, a variation of the first embodiment has been particularly described with reference to an operation of an eNodeB in a macrocell in a case where the cell adjacent to another cell is the macrocell. Next, a second embodiment of the present disclosure will be particularly described with reference to an operation of an eNodeB in a small cell which covers all or part of a macrocell. In the second embodiment, in the small cell, the link direction is dynamically set for each sub-frame of a first frequency band, and the link direction is set for each sub-frame of a second frequency band so that the difference in link direction between the small cell and the macrocell is reduced, i.e., as large a number of sub-frames as possible have the same link direction. And, communication resources of the first frequency band are not allocated to a terminal device which is located in the peripheral portion of the small cell. The second embodiment will now be more specifically outlined with reference to FIGS. 15 and 16.

Figure 15:
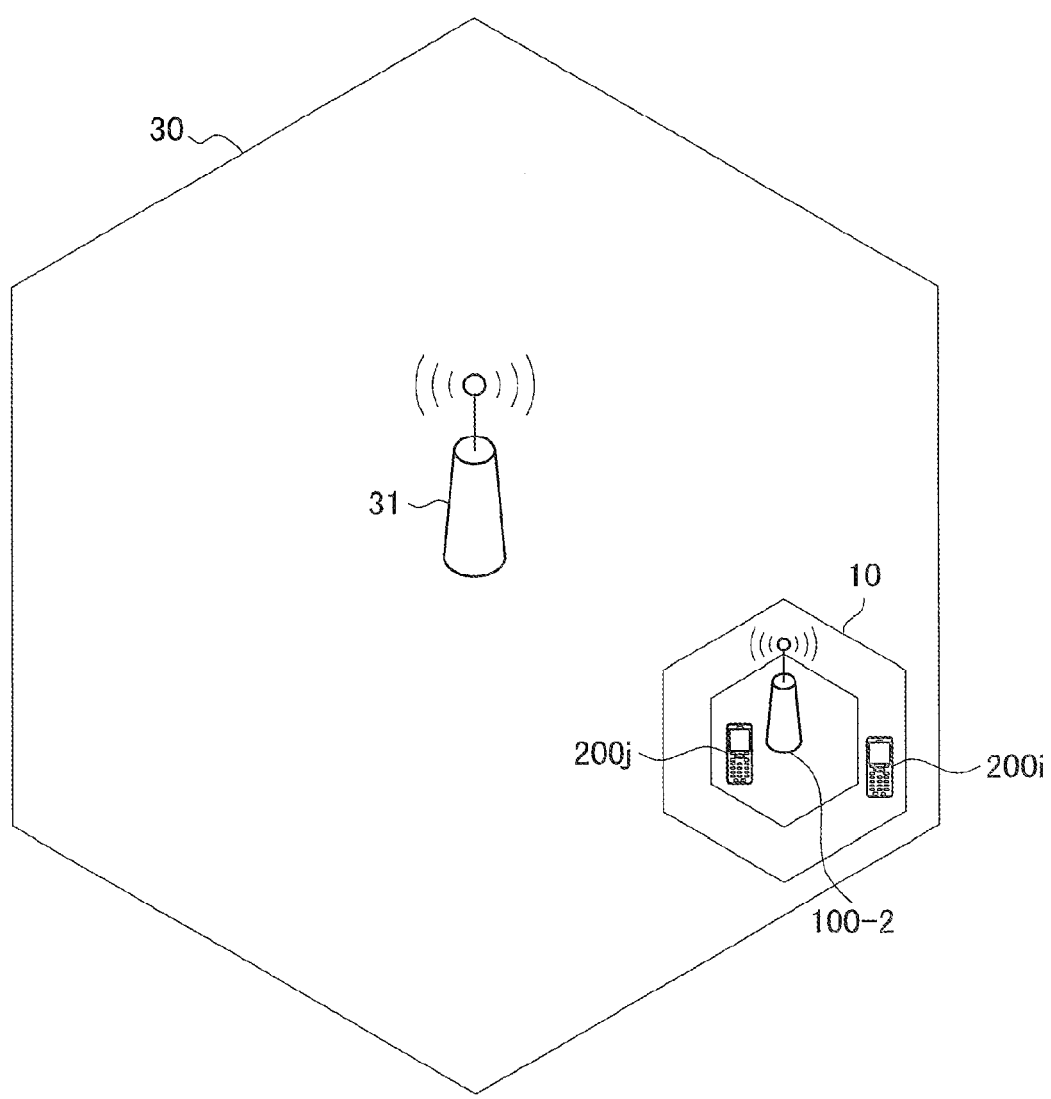
FIG. 15 is a diagram for outlining a second embodiment.
Figure 16:
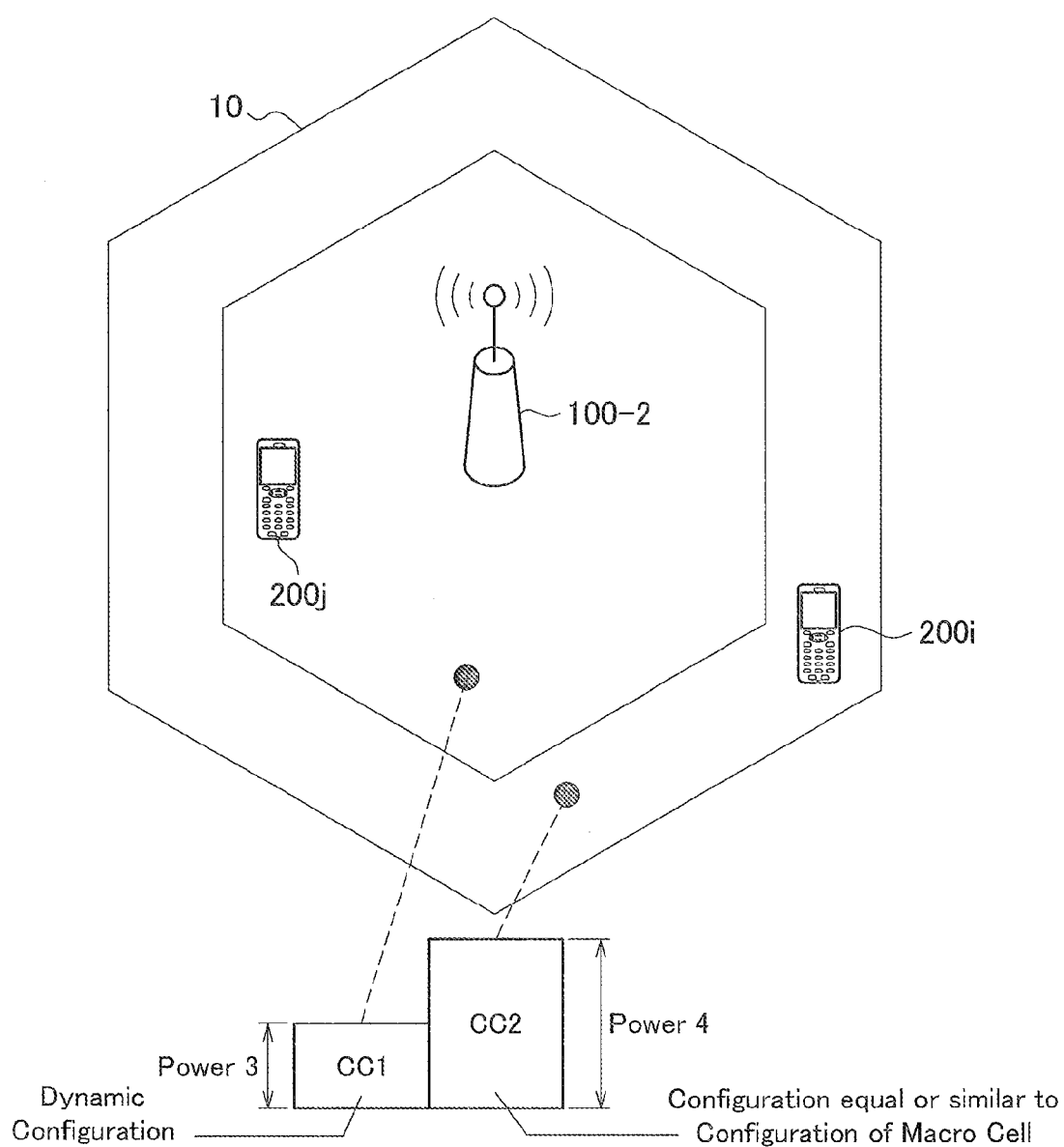
FIG. 16 is a diagram for outlining the second embodiment.

FIGS. 15 and 16 are diagrams for outlining the second embodiment. Referring to FIG. 15, a macrocell 30 and a cell 10 which is a small cell are shown. An eNodeB 100-2 according to this embodiment is an eNodeB in the small cell. Referring to FIG. 16, the cell 10 which is a small cell is shown in greater detail. In this embodiment, the cell 10 is divided into a peripheral portion which is further from the eNodeB 100-2 and a central portion (i.e., a central portion closer to the eNodeB 100-2) other than the peripheral portion. And, in the central portion of the cell 10, the TDD configuration is dynamically set. On the other hand, in the peripheral portion of the cell 10, the TDD configuration is set to be equal or similar to that of the macrocell. Also, for example, in the peripheral portion of the cell 10, the TDD configuration is statically or quasi-statically set.

For example, in the cell 10 which is a small cell, the carrier aggregation technique of aggregating a plurality of cells is used. When the plurality of CCs include a CC 1 and a CC 2, the CC 1 is used as communication resources for a UE 200 which is located in the central portion of the cell 10, and the CC 2 is used as communication resources for a UE 200 which is located in the peripheral portion (and the central portion) of the cell 10. For the CC 1, the TDD configuration is dynamically set based on the traffic. For the CC 2, the TDD configuration is set (e.g., statically or quasi-statically) to be equal or similar to that of the macrocell.

By thus setting the TDD configuration and allocating communication resources, in the cell 10 communication resources of a frequency band in which the link direction is dynamically set are allocated only to a UE 200 which is located in the central portion of the cell 10 which is a small cell. Therefore, in the cell 10, transmission power of the communication resources can be reduced. As a result, an uplink signal on the communication resources of the cell 10 does not substantially interfere with a downlink signal of the macrocell 30, and a downlink signal on the communication resources of the cell 10 does not substantially interfere with an uplink signal of the macrocell 30. Specifically, in a frequency band in which the link direction is dynamically set, interference of a small cell with a macrocell, such as those shown in FIGS. 5 and 6, does not substantially occur.

Moreover, the distance between a UE 200 which is located in the central portion of the cell 10 which is a small cell, and the eNodeB 100-2, is smaller than the distance between an eNodeB 31 and the eNodeB 100-2, and therefore, a downlink signal of the macrocell 30 does not substantially interfere with an uplink signal of the cell 10. Also, the distance between a UE 200 which is located in the central portion of the cell 10 which is a small cell, and the eNodeB 100-2, is smaller than the distance between that UE 200 and a UE 200 which communicates with the eNodeB 31, and therefore, an uplink signal of the macrocell 30 does not substantially interfere with a downlink signal of the cell 10. Specifically, in a frequency band in which the link direction is dynamically set, interference of a macrocell with a small cell, such as those shown in FIGS. 5 and 6, does not substantially occur.

Note that, in the cell 10 which is a small cell, only communication resources of a frequency band (the CC 2) in which the difference in link direction from the macrocell 30 is small are allocated to a UE 200 which is located in the peripheral portion of the cell 10. Therefore, in the frequency band, interference, such as those of FIGS. 5 and 6, does not substantially occur.

Therefore, in a radio communication system employing TDD, by dynamically setting the link direction, interference between a macrocell and a small cell can be reduced while improving throughput.

3. 2. Configuration of eNodeB

Figure 17:
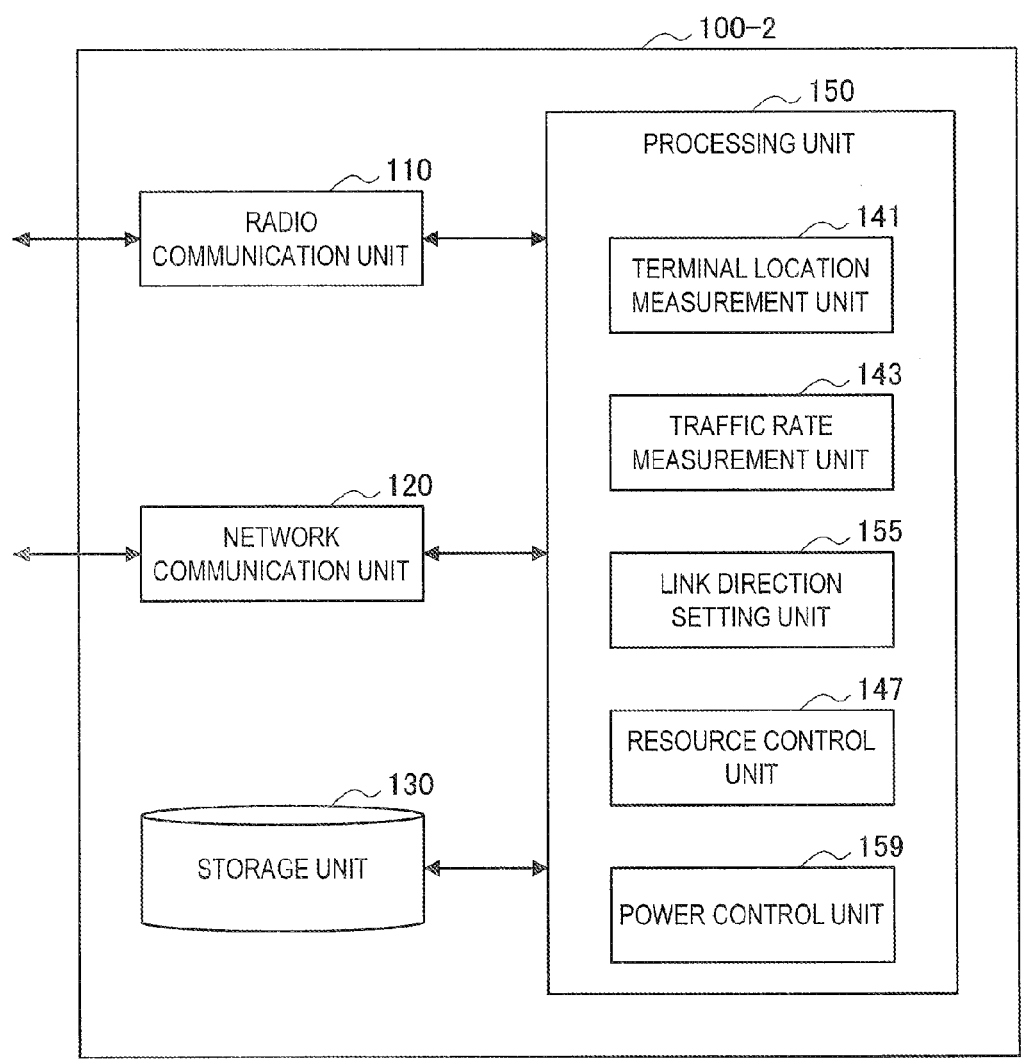
FIG. 17 is a block diagram showing an example configuration of an eNodeB according to the second embodiment.

An example configuration of the eNodeB 100-2 of the second embodiment will be described with reference to FIG. 17. FIG. 17 is a block diagram showing the example configuration of the eNodeB 100-2 of the second embodiment. Referring to FIG. 17, the eNodeB 100-2 includes a radio communication unit 110, a network communication unit 120, a storage unit 130, and a processing unit 150.

Here, the radio communication unit 110, the network communication unit 120, and the storage unit 130 are not different between the first embodiment and the second embodiment. Also, in the processing unit 150, the terminal location measurement unit 141, the traffic rate measurement unit 143, and the resource control unit 147 are not different between the first embodiment and the second embodiment. Therefore, here, a link direction setting unit 155 and a power control unit 159 will be described.

(Link Direction Setting Unit 155)

The link direction setting unit 155 dynamically sets the link direction for each sub-frame of the first frequency band, and sets the link direction for each sub-frame of the second frequency band so that the difference in link direction between the cell 10 and a cell related to the cell 10 is reduced. In this embodiment, the cell 10 is a small cell, and the related cell is a macrocell 30 which covers all or part of the cell 10. For example, the link direction setting unit 155 dynamically sets the TDD configuration of the CC 1 based on the uplink or downlink traffic rate. As an example, the TDD configuration of the CC 1 is set every 10 ms to several tens of milliseconds. Also, the link direction setting unit 155 sets the TDD configuration of the CC 2 to be equal or similar to the TDD configuration of the CC 2 of the macrocell 30. As an example, the link direction setting unit 155 is notified of the TDD configuration of the CC 2 of the macrocell 30 by the eNodeB 31 through the network communication unit 120.

Note that, in the macrocell 30, communication resources of a frequency band corresponding to the location of a UE 200 may be allocated to the UE 200. In this case, if the cell 10 is located in the peripheral portion of the macrocell 30, the second frequency band (e.g., the CC 2) may be a frequency band which is allocated to a UE 200 which is located in the peripheral portion of the macrocell 30. Also, if the cell 10 is not located in the peripheral portion of the macrocell 30 (i.e., the cell 10 is located in the central portion), the second frequency band may be a frequency band which is allocated to a UE 200 which is not located in the peripheral portion of the macrocell 30 (i.e., a UE 200 which is located in the central portion).

(Power Control Unit 159)

The power control unit 159 controls transmission power in the cell 10. For example, the power control unit 159 controls transmission power of the radio communication unit 110. For example, the power control unit 159 allocates small transmission power to downlink in the first frequency band (e.g., the CC 1), and large transmission power to downlink in the second frequency band (e.g., the CC 2).

Also, for example, the eNodeB 100-2 causes a UE 200 which is located in the central portion of the cell 10 and in which communication resources of the first frequency band (e.g., the CC 1) are allocated to uplink to allocate small transmission power to uplink in the first frequency band. Also, the eNodeB 100-1 causes a UE 200 which is located in the peripheral portion of the cell 10 and in which communication resources of the second frequency band (e.g., the CC 2) are allocated to uplink to allocate large transmission power to uplink in the second frequency band.

Note that the power control unit 159 may request the eNodeB 31 of the macrocell 30 to reduce transmission power in the macrocell 30 in a sub-frame in which the link direction of the second frequency band in the cell 10 is different from the link direction of the second frequency band in the macrocell 30. For example, the power control unit 159 notifies the eNodeB 31, through the network communication unit 120, of a sub-frame in which the link direction of the CC 2 in the cell 10 is different from the link direction of the CC 2 in the macrocell 30. By thus reducing transmission power in the macrocell 30, interference of a downlink signal in the macrocell 30 with an uplink signal in the cell 10, and interference of an uplink signal of the macrocell 30 with a downlink signal of the cell 10, can be further reduced.

3. 3. Flow of Process

Figure 18:
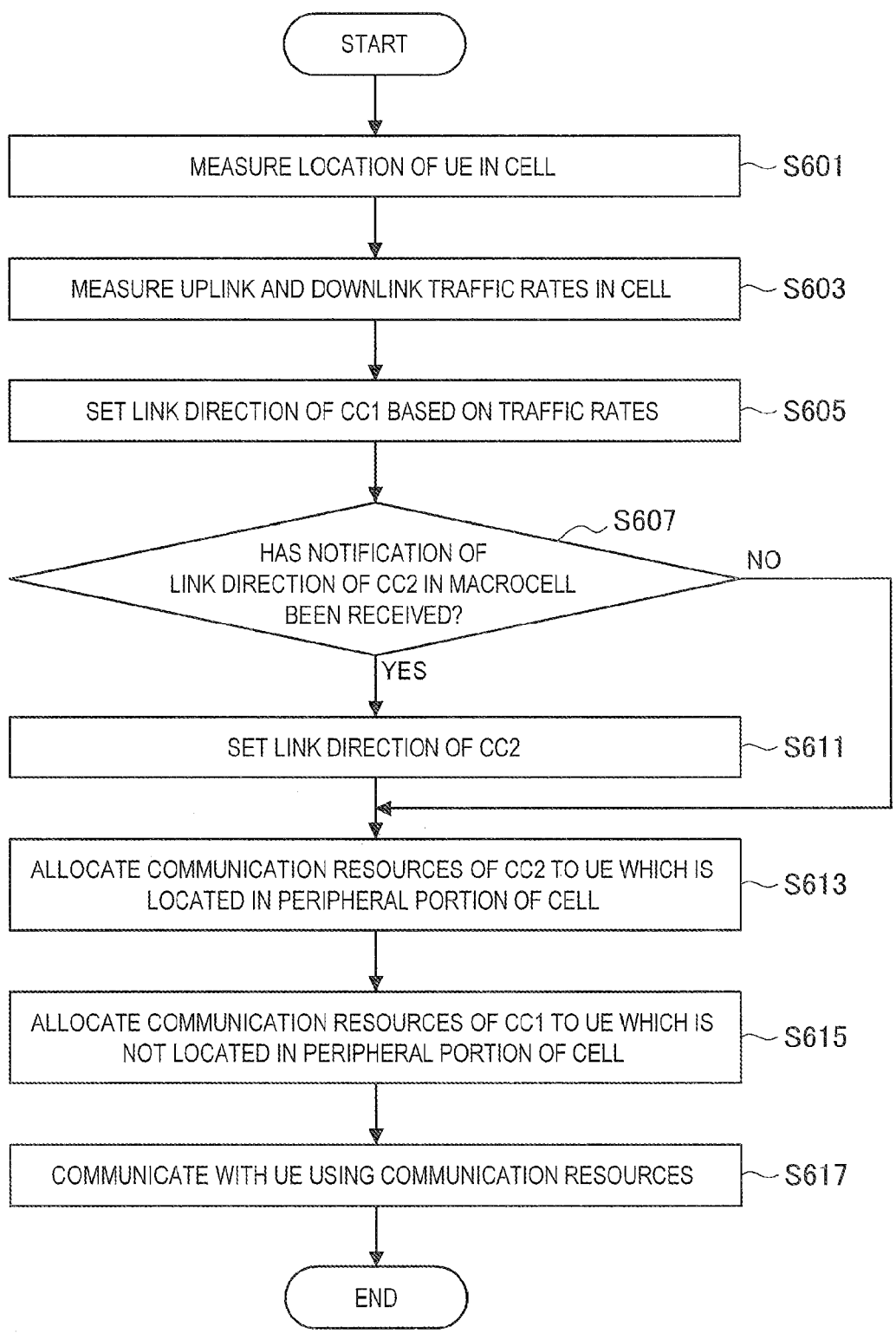
FIG. 18 is a flowchart showing an example schematic flow of a communication control process according to the second embodiment.

Next, an example communication control process according to the second embodiment will be described with reference to FIG. 18. FIG. 18 is a flowchart showing an example schematic flow of the communication control process of the second embodiment. The communication control process is a process in the eNodeB 100-2. Steps S501-S505 and S511-S517 of the communication control process of the first embodiment described with reference to FIG. 10 correspond to steps S601-S605 and S611-S617 of the communication control process of the second embodiment. Therefore, here, only step S607 will be described which is the difference between the example communication control process of the first embodiment described with reference to FIG. 10 and the example communication control process of the second embodiment.

In step S607, the link direction setting unit 155 determines whether or not the link direction setting unit 155 itself has been notified of the link direction (i.e., the TDD configuration) of the CC 2 of the macrocell 30 by the eNodeB 31 through the network communication unit 120. If the link direction setting unit 155 has been notified of the link direction, control proceeds to step S611. Otherwise, control proceeds to step S613.

4. Third Embodiment

4. 1. Overview

Next, a third embodiment of the present disclosure will be described. In the third embodiment, communication resources in a sub-frame in which the link direction in a cell is different from the link direction in a cell adjacent to that cell are not allocated to a terminal device which is located in the peripheral portion of that cell. The third embodiment will now be more specifically described with reference to FIG. 19.

Figure 19:
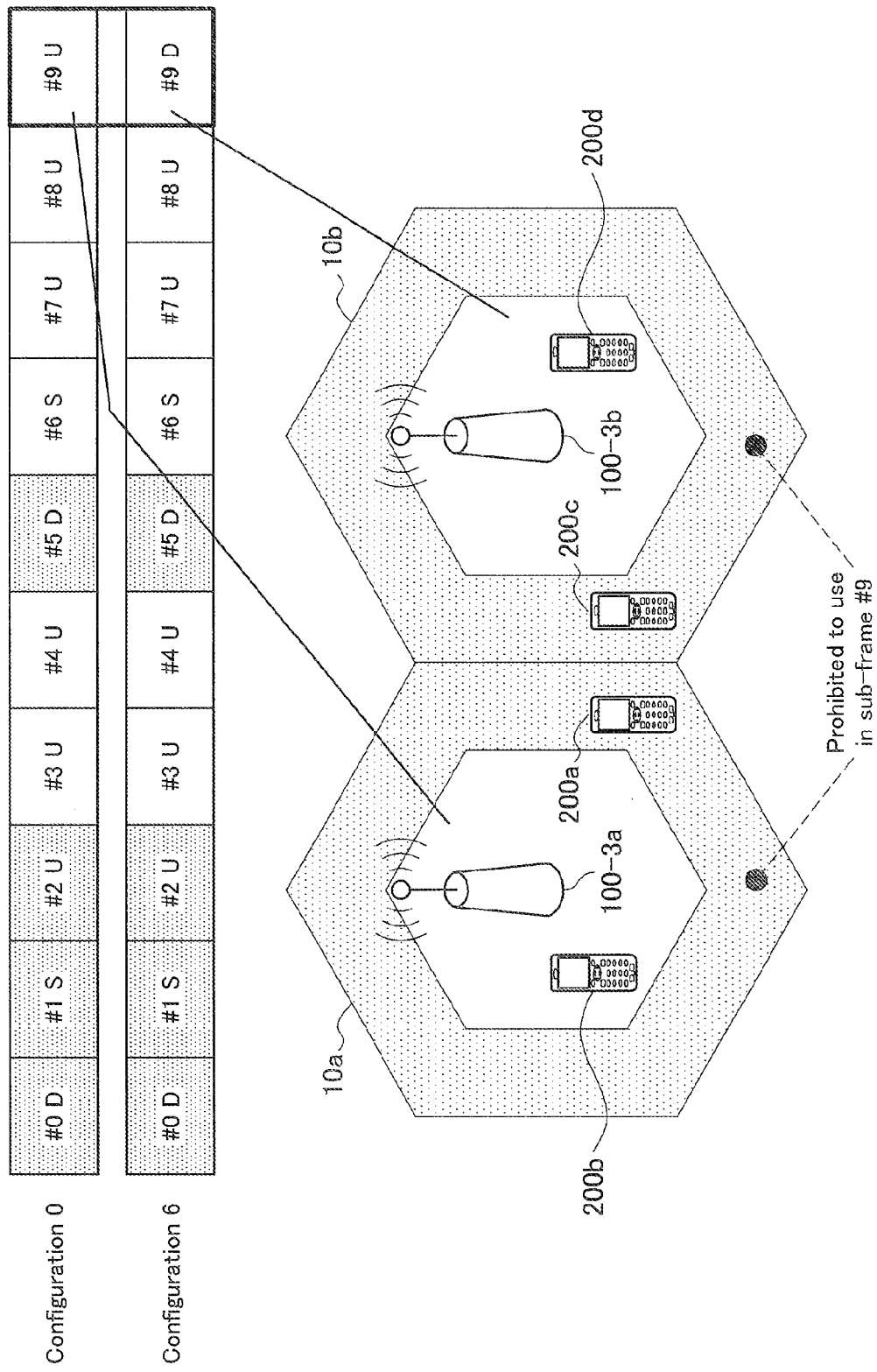
FIG. 19 is a diagram for outlining a third embodiment.

FIG. 19 is a diagram for outlining the third embodiment. Referring to FIG. 19, a cell 10a and a cell 10b adjacent to the cell 10a are shown. In the cell 10a and the cell 10b, the link direction (i.e., the TDD configuration) is dynamically set for each sub-frame. As an example, in some radio frame, in the cell 10a, a TDD configuration corresponding to the configuration 0 of FIG. 3 is set for each frequency band. Also, in the same radio frame, in the cell 10b, a TDD configuration corresponding to the configuration 6 of FIG. 3 is set for each frequency band. In this case, a sub-frame in which the link direction of the cell 10a is different from the link direction of the cell 10b is the sub-frame #9. Therefore, while interference such as that shown in FIG. 4 does not occur in the sub-frames #0-#8, interference such as that shown in FIG. 4 occurs in the sub-frame #9. Therefore, in this embodiment, while communication resources in the sub-frames #0-8 may be allocated to any UE 200, communication resources in the sub-frame #9 are not allocated to a UE 200 which is located in the peripheral portion of the cell 10. Specifically, communication resources in the sub-frame #9 are allocated only to a UE 200 which is located in the central portion of the cell 10.

By thus allocating communication resources, communication resources are allocated only to a UE 200 which is located in the central portion of the cell 10, in a sub-frame of a radio frame in which the link direction is different between adjacent cells. Therefore, transmission power in the sub-frame can be reduced. As a result, in the sub-frame, an uplink signal of the cell 10 does not substantially interfere with a downlink signal of an adjacent cell, and a downlink signal of the cell 10 does not substantially interfere with an uplink signal of an adjacent cell. Specifically, even in a sub-frame in which the link direction is different between adjacent cells, interference such as that shown in FIG. 4 does not substantially occur. Also, of course, even in a sub-frame of a radio frame in which the link direction is the same between adjacent cells, interference such as that shown in FIG. 4 does not substantially occur. Therefore, in a radio communication system employing TDD, by dynamically setting the link direction, interference between adjacent cells can be reduced while improving throughput.

4. 2. Configuration of eNodeB

Figure 20:
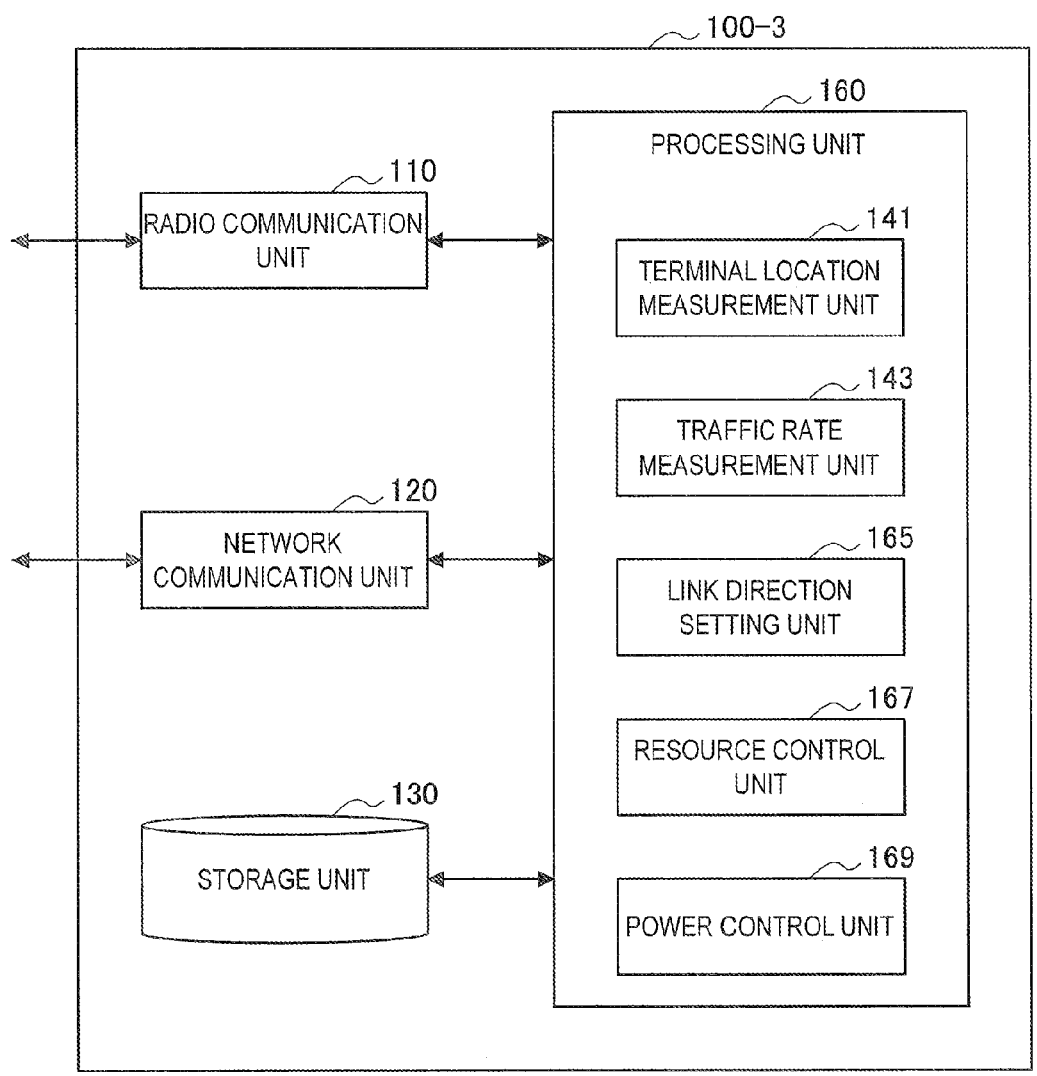
FIG. 20 is a block diagram showing an example configuration of an eNodeB according to the third embodiment.

An example configuration of an eNodeB 100-3 according to the third embodiment will be described with reference to FIG. 20. FIG. 20 is a block diagram showing the example configuration of the eNodeB 100-3 of the third embodiment. Referring to FIG. 20, the eNodeB 100-3 includes a radio communication unit 110, a network communication unit 120, a storage unit 130, and a processing unit 160.

Here, the radio communication unit 110, the network communication unit 120, and the storage unit 130 are not different between the first embodiment and the third embodiment. Also, in the processing unit 160, the terminal location measurement unit 141 and the traffic rate measurement unit 143 are not different between the first embodiment and the third embodiment. Therefore, here, a link direction setting unit 165, a resource control unit 167, and a power control unit 169 will be described.

(Link Direction Setting Unit 165)

The link direction setting unit 165 dynamically sets the link direction for each sub-frame of one or more frequency bands. For example, the one or more frequency bands include a CC 1 and a CC 2. The link direction setting unit 165 dynamically sets any of the TDD configurations of FIG. 3 for the CC 1 and the CC 2 based on the uplink or downlink traffic rate. As an example, the TDD configuration is set every 10 ms to several tens of milliseconds. For the CC 1 and the CC 2, the same TDD configuration may be set, or different TDD configurations may be set.

Also, the link direction setting unit 165 notifies an adjacent cell of the link direction (i.e., the TDD configuration) in the cell 10, for example, through the network communication unit 120.

(Resource Control Unit 167)

The resource control unit 167 controls allocation of communication resources to a UE 200 based on the setting of the link direction of a channel in which the link direction can be dynamically set for each sub-frame, and the location of the UE 200 in the cell 10. In particular, in this embodiment, the resource control unit 167 does not allocate communication resources in a sub-frame in which the link direction in the cell 10 is different from the link direction in a cell related to the cell 10, to a UE 200 which is located in the peripheral portion of the cell 10. The related cell is a cell adjacent to the cell 10. For example, when the sub-frame in which the link direction is different between the cell 10 and the adjacent cell is the sub-frame #9, the resource control unit 167 does not allocate communication resources in the sub-frame #9 to a UE 200 which is located in the peripheral portion of the cell 10. Specifically, the resource control unit 167 allocates communication resources in the sub-frame #9 only to a UE 200 which is located in the central portion of the cell 10. Also, the resource control unit 167 allocates communication resources in the sub-frames #0-8 to a UE 200 which is located in the peripheral portion of the cell 10 and a UE 200 which is located in the central portion of the cell 10.

Note that the resource control unit 167 is notified of the link direction (i.e., the TDD configuration) in the adjacent cell by the eNodeB 100-3 in the adjacent cell.

(Power Control Unit 169)

The power control unit 169 controls transmission power in the cell 10. For example, the power control unit 169 reduces transmission power in the cell 10, in a sub-frame in which the link direction in the cell 10 is different from the link direction in a cell adjacent to the cell 10. More specifically, the power control unit 169 allocates small transmission power to downlink. Also, the power control unit 169 causes a UE 200 which is located in the central portion of the cell 10 to allocate small transmission power to uplink.

4. 4. Flow of Process

Figure 21:
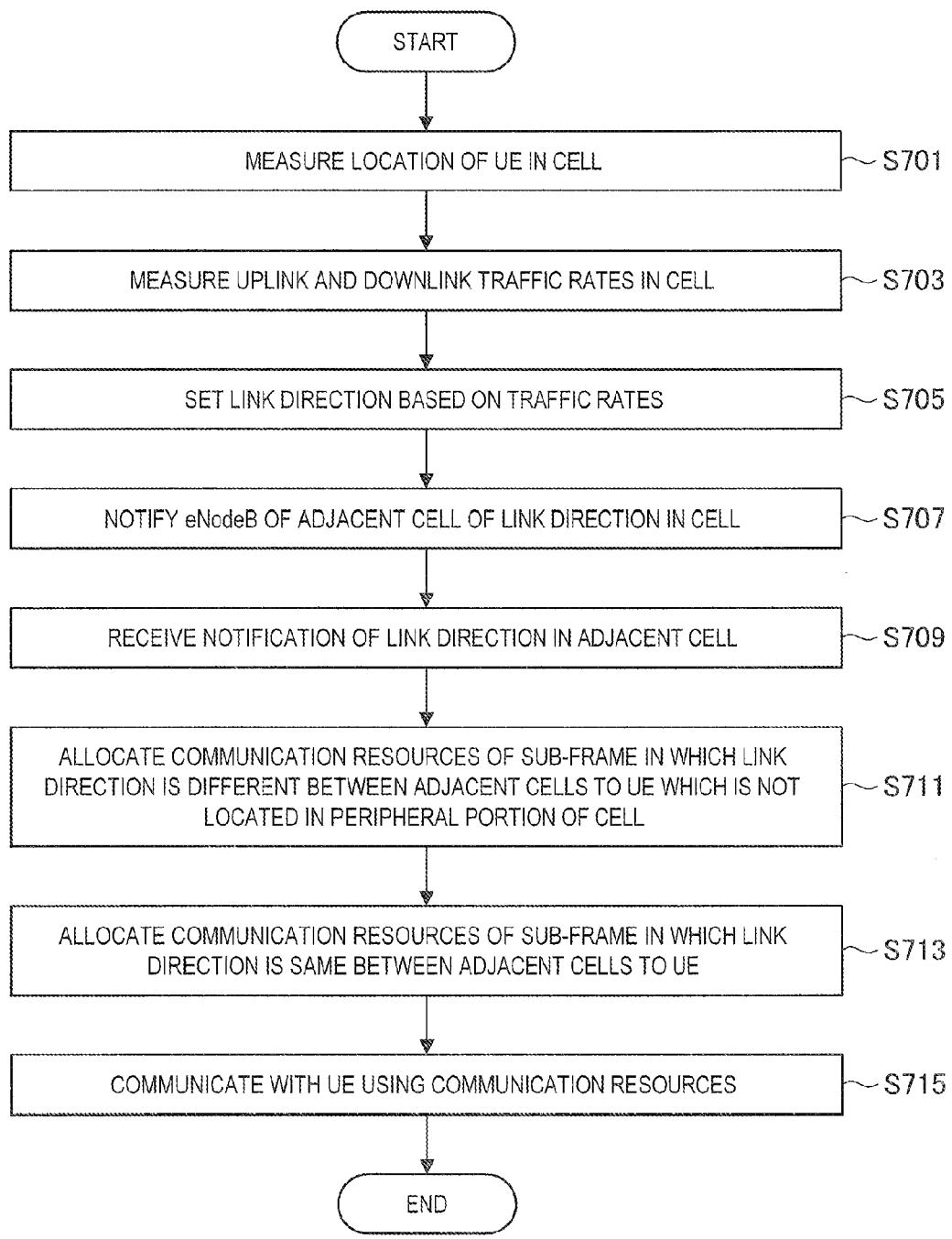
FIG. 21 is a flowchart showing an example schematic flow of a communication control process according to the third embodiment.

Next, an example communication control process according to the third embodiment will be described with reference to FIG. 21. FIG. 21 is a flowchart showing an example schematic flow of the communication control process of the third embodiment. Note that the communication control process is a process in the eNodeB 100-3.

Initially, in step S701, the terminal location measurement unit 141 measures the location of a UE 200 in the cell 10. Also, in step S703, the traffic rate measurement unit 143 measures the uplink traffic rate and the downlink traffic rate in the cell 10.

In step S705, the link direction setting unit 165 sets the link direction (i.e., the TDD configuration) for each sub-frame based on the measured traffic rates. Also, in step S707, the link direction setting unit 165 notifies an adjacent cell of the link direction in the cell 10, for example, through the network communication unit 120. Also, in step S709, the resource control unit 167 is notified of the link direction (i.e., the TDD configuration) in the adjacent cell by the adjacent cell.

In step S711, the resource control unit 167 allocates communication resources in a sub-frame in which the link direction in the cell 10 is different from the link direction in a cell adjacent to the cell 10, to a UE 200 which is not located in the peripheral portion of the cell 10 (i.e., a UE 200 which is located in the central portion of the cell 10). Also, in step S713, the resource control unit 167 allocates communication resources in a sub-frame in which the link direction in the cell 10 is the same as the link direction in a cell adjacent to the cell 10, to a UE 200 which is located in the cell 10.

In step S715, the radio communication unit 110 communicates with the UE 200 using the allocated communication resources.

5. Fourth Embodiment

5. 1. Overview

The third embodiment has been particularly described with reference to an operation of an eNodeB in a cell adjacent to another cell. Next, a fourth embodiment of the present disclosure will be particularly described with reference to an operation of an eNodeB in a small cell which covers all or part of a macrocell. In the fourth embodiment, communication resources in a sub-frame in which the link direction in a small cell is different from the link direction in a macrocell which covers all or part of the small cell, are not allocated to a terminal device which is located in the peripheral portion of the small cell, in the small cell. The fourth embodiment will now be more specifically outlined with reference to FIG. 22.

Figure 22:
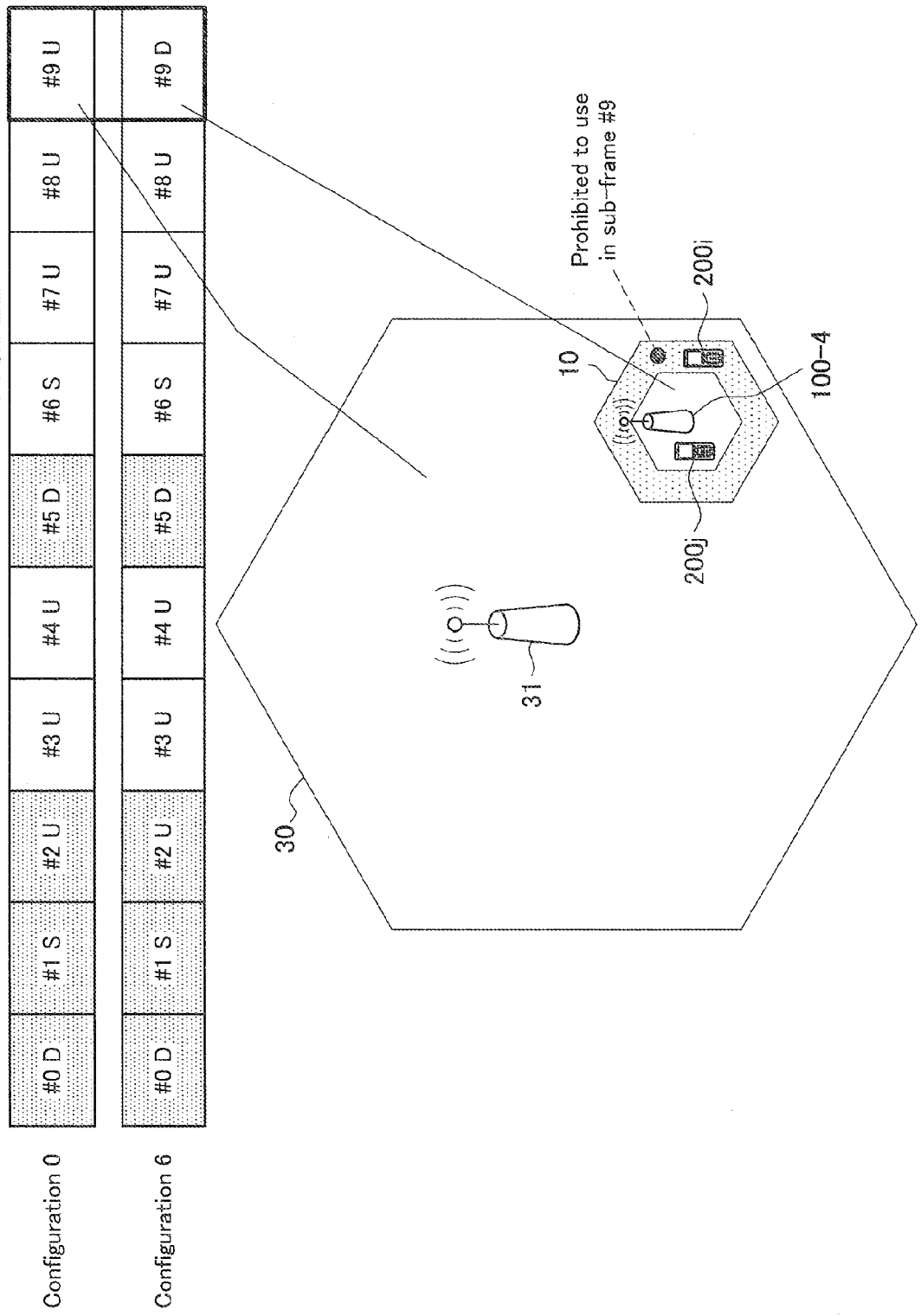
FIG. 22 is a diagram for outlining a fourth embodiment.

FIG. 22 is a diagram for outlining the fourth embodiment. Referring to FIG. 22, a cell 10 which is a small cell, and a macrocell 30 which covers all or part of the cell 10, are shown. In the cell 10, the link direction (i.e., the TDD configuration) is dynamically set for each sub-frame. On the other hand, in the macrocell 30, the link direction (i.e., the TDD configuration) may be dynamically, or alternatively statically or quasi-statically, set for each sub-frame. As an example, in some radio frame, in the cell 10, in each frequency band, a TDD configuration corresponding to the configuration 6 of FIG. 3 is set. Also, in the same radio frame, in the macrocell 30, in each frequency band, a TDD configuration corresponding to the configuration 0 of FIG. 3 is set. In this case, a sub-frame in which the link direction in the cell 10 is different from the link direction in the macrocell 30 is the sub-frame #9. Therefore, while interference such as those shown in FIGS. 5 and 6 does not occur in the sub-frames #0-#8, interference such as those shown in FIGS. 5 and 6 may occur in the sub-frame #9. Therefore, in this embodiment, in the cell 10, while communication resources in the sub-frames #0-8 are allocated to any UE 200, communication resources in the sub-frame #9 are not allocated to a UE 200 which is located in the peripheral portion of the cell 10. Specifically, in the cell 10, communication resources in the sub-frame #9 are allocated only to a UE 200 which is located in the central portion of the cell 10.

By thus allocating communication resources, communication resources are allocated only to a UE 200 which is located in the central portion of the cell 10, in the cell 10, in a sub-frame of a radio frame in which the link direction is different between the cell 10 which is a small cell and the macrocell 30. Therefore, in the cell 10, transmission power in the sub-frame can be reduced. As a result, in the sub-frame, an uplink signal of the cell 10 does not substantially interfere with a downlink signal of the macrocell 30, and a downlink signal of the cell 10 does not substantially interfere with an uplink signal of the macrocell 30. Specifically, even in a sub-frame in which the link direction is different between adjacent cells, interference of a small cell with a macrocell, such as those shown in FIGS. 5 and 6, does not substantially occur.

Moreover, the distance between a UE 200 which is located in the central portion of the cell 10 which is a small cell and an eNodeB 100-4 is smaller than the distance between an eNodeB 31 and the eNodeB 100-4, and therefore, a downlink signal of the macrocell 30 does not substantially interfere with an uplink signal of the cell 10. Also, the distance between a UE 200 which is located in the central portion of the cell 10 and the eNodeB 100-4 is smaller than the distance between that UE 200 and a UE 200 which communicates with the eNodeB 31, and therefore, an uplink signal of the macrocell 30 does not substantially interfere with a downlink signal of the cell 10. Specifically, even in a sub-frame in which the link direction is different between adjacent cells, interference of a macrocell with a small cell, such as those shown in FIGS. 5 and 6, does not substantially occur.

Also, of course, even in a sub-frame of a radio frame in which the link direction is the same between the cell 10 and the macrocell 30, interference such as those shown in FIGS. 5 and 6 does not occur.

Therefore, in a radio communication system employing TDD, by dynamically setting the link direction, interference between adjacent cells can be reduced while improving throughput.

5. 2. Configuration of eNodeB

Figure 23:
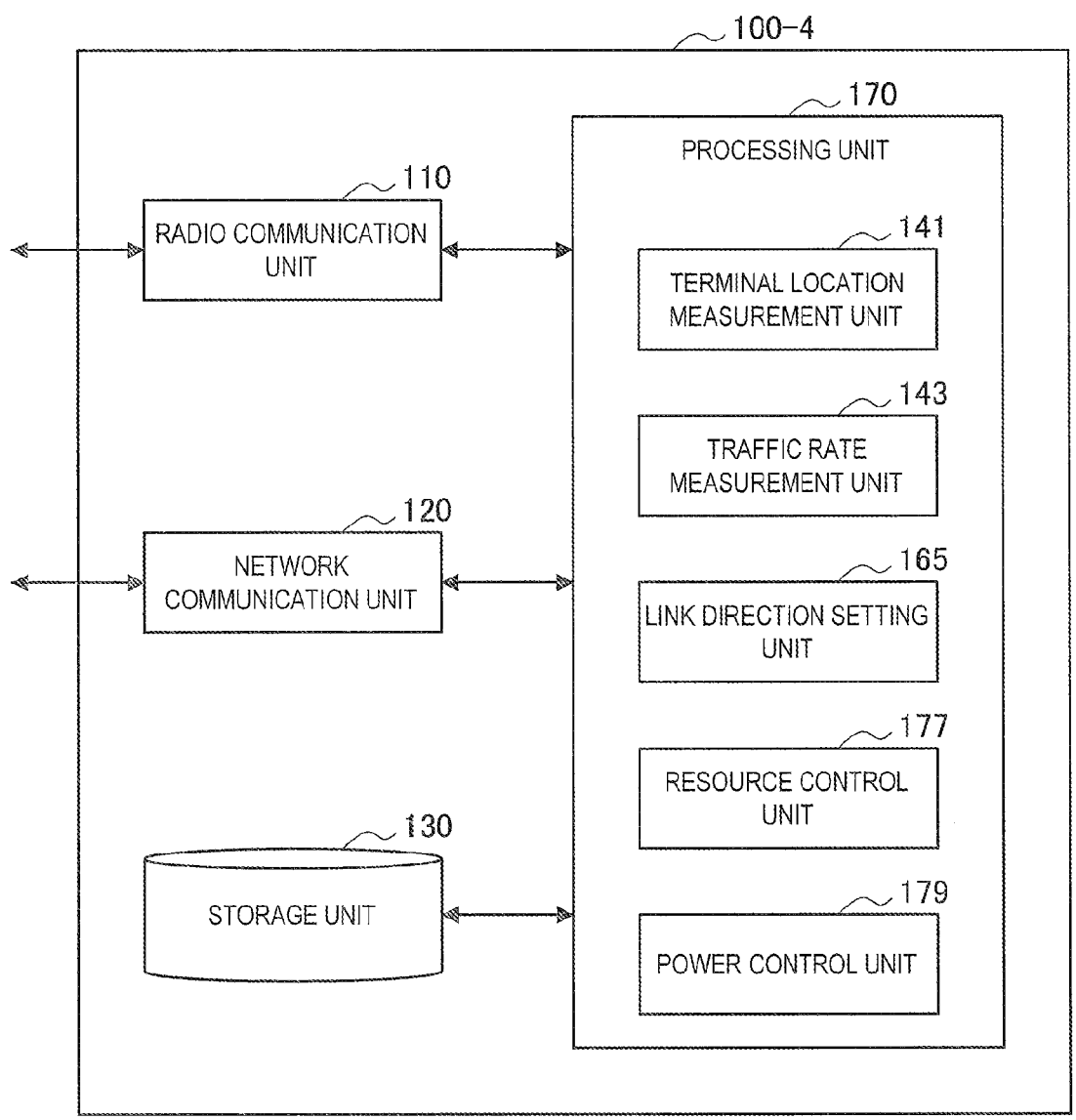
FIG. 23 is a block diagram showing an example configuration of an eNodeB according to the fourth embodiment.

An example configuration of the eNodeB 100-4 of the fourth embodiment will be described with reference to FIG. 23. FIG. 23 is a block diagram showing an example configuration of the eNodeB 100-4 of the fourth embodiment. Referring to FIG. 23, the eNodeB 100-4 includes a radio communication unit 110, a network communication unit 120, a storage unit 130, and a processing unit 170.

Here, the radio communication unit 110, the network communication unit 120, and the storage unit 130 are not different between the third embodiment and the fourth embodiment. Also, even in the processing unit 170, the terminal location measurement unit 141, the traffic rate measurement unit 143, and the link direction setting unit 165 are not different between the third embodiment and the fourth embodiment. Therefore, here, a resource control unit 177 and a power control unit 179 will be described.

(Resource Control Unit 177)

The resource control unit 177 controls allocation of communication resources to a UE 200 based on the setting of the link direction of a channel in which the link direction can be dynamically set for each sub-frame, and the location of the UE 200 in the cell 10. In particular, in this embodiment, the resource control unit 177 does not allocate communication resources in a sub-frame in which the link direction in the cell 10 is different from the link direction in a cell related to the cell 10, to a UE 200 which is located in the peripheral portion of the cell 10. Here, the cell 10 is a small cell, and the related cell is a macrocell which covers all or part of the cell 10. For example, when the sub-frame in which the link direction is different between the cell 10 and the macrocell 30 is the sub-frame #9, the resource control unit 177 does not allocate communication resources in the sub-frame #9 to a UE 200 which is located in the peripheral portion of the cell 10. Specifically, the resource control unit 177 allocates communication resources in the sub-frame #9 only to a UE 200 which is located in the central portion of the cell 10. Also, the resource control unit 167 allocates communication resources in the sub-frames #0-8 to a UE 200 which is located in the peripheral portion of the cell 10 and a UE 200 which is located in the central portion of the cell 10.

Note that the resource control unit 177 is notified of the link direction (i.e., the TDD configuration) in the macrocell 30 by the eNodeB 31 of the macrocell 30.

(Power Control Unit 179)

The power control unit 179 controls transmission power in the cell 10. For example, the power control unit 179 reduces transmission power in the cell 10, in a sub-frame in which the link direction in the cell 10 is different from the link direction in the macrocell 30. More specifically, the power control unit 179 allocates small transmission power to downlink. Also, the power control unit 179 causes a UE 200 which is located in the central portion of the cell 10 to allocate small transmission power to uplink.

Note that the power control unit 179 may request the eNodeB 31 of the macrocell 30 to reduce transmission power in the macrocell 30 in a sub-frame in which the link direction in the cell 10 is different from the link direction in the macrocell 30. For example, the power control unit 179 notifies the eNodeB 31, through the network communication unit 120, of a sub-frame in which the link direction in the cell 10 is different from the link direction in the macrocell 30. By thus reducing transmission power in the macrocell 30, interference of a downlink signal of the macrocell 30 with an uplink signal of the cell 10, and interference of an uplink signal of the macrocell 30 with a downlink signal of the cell 10, can be further reduced.

5. 3. Flow of Process

Figure 24:
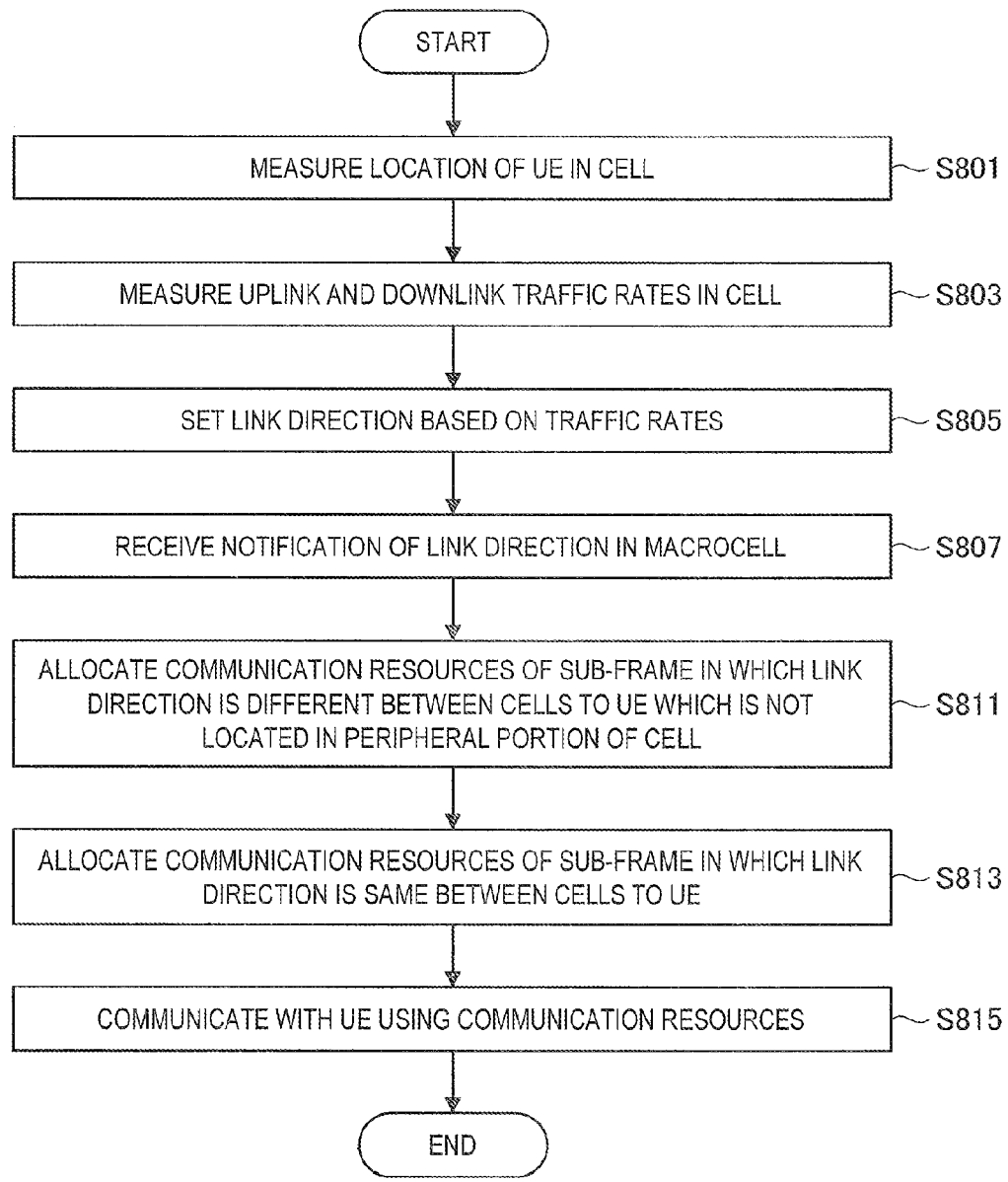
FIG. 24 is a flowchart showing an example schematic flow of a communication control process according to the fourth embodiment.

Next, an example communication control process according to the fourth embodiment will be described with reference to FIG. 24. FIG. 24 is a flowchart showing an example schematic flow of the communication control process of the fourth embodiment. Note that the communication control process is a process in the eNodeB 100-4. Steps S701-S705 and S715 of the communication control process of the third embodiment described with reference to FIG. 21 correspond to steps S801-S805 and S815 of the communication control process of the fourth embodiment, respectively. Therefore, here, only steps S807, S811, and S813 will be described which is the difference between the example communication control process of the third embodiment described with reference to FIG. 21 and the example communication control process of the fourth embodiment.

In step S807, the resource control unit 177 is notified of the link direction (i.e., the TDD configuration) in the macrocell 30 by the eNodeB 31 of the macrocell 30.

In step S811, the resource control unit 177 allocates communication resources in a sub-frame in which the link direction in the cell 10 is different from the link direction in the macrocell 30 to a UE 200 which is not located in the peripheral portion of the cell 10 (i.e., a UE 200 which is located in the central portion of the cell 10). Also, in step S813, the resource control unit 177 allocates communication resources in a sub-frame in which the link direction in the cell 10 is the same as the link direction in the macrocell 30 to a UE 200 which is located in the cell 10.

6. Summary

The eNodeB 100 of the embodiments of the present disclosure have been described above with reference to FIGS. 1-24. According to these embodiments, allocation of communication resources to a UE 200 is controlled based on the setting of the link direction of a channel in which the link direction can be dynamically set for each sub-frame, and the location of the UE 200 in the cell 10.

For example, as in the first embodiment and the second embodiment, the link direction is dynamically set for each sub-frame of the first frequency band, and the link direction is set for each sub-frame of the second frequency band so that the difference in link direction between the cell 10 and a cell (an adjacent cell or a macrocell) related to the cell 10 is reduced. And, communication resources of the first frequency band are not allocated to a UE 200 which is located in the peripheral portion of the cell 10.

By thus setting the TDD configuration and allocating communication resources, communication resources of a frequency band in which the link direction is dynamically set are allocated only to a UE 200 which is allocated in the central portion of the cell 10. Therefore, transmission power of the communication resources can be reduced. As a result, an uplink signal on the communication resources does not substantially interfere with a downlink signal of a related cell, and a downlink signal on the communication resources does not substantially interfere with an uplink signal of a related cell. Specifically, in a frequency band in which the link direction is dynamically set, interference such as those shown in FIGS. 4-6 does not substantially occur. Note that only communication resources of a frequency band in which the difference in link direction from a related cell is small are allocated to a UE 200 which is located in the peripheral portion of the cell 10. Of course, in the frequency band, interference such as those shown in FIGS. 4-6 does not substantially occur. Therefore, in a radio communication system employing TDD, by dynamically setting the link direction, interference between adjacent cells can be reduced while improving throughput.

Also, for example, as in the third embodiment and the fourth embodiment, communication resources in a sub-frame in which the link direction in the cell 10 is different from the link direction in a cell (an adjacent cell or a macrocell) related to the cell 10 are not allocated to a UE 200 which is located in the peripheral portion of the cell 10.

By thus allocating communication resources, communication resources are allocated only to a UE 200 which is allocated in the central portion of the cell 10, in a sub-frame of a radio frame in which the link direction is different between the cell 10 and a related cell. Therefore, in the cell 10, transmission power in the sub-frame can be reduced. As a result, in the sub-frame, an uplink signal of the cell 10 does not substantially interfere with a downlink signal of a related cell, and a downlink signal of the cell 10 does not substantially interfere with an uplink signal of a related cell. Specifically, even in a sub-frame in which the link direction is different between the cell 10 and a related cell, interference such as those shown in FIGS. 4-6 does not substantially occur. Also, of course, even in a sub-frame of a radio frame in which the link direction is the same between adjacent cells, interference such as those shown in FIGS. 4-6 does not substantially occur. Therefore, in a radio communication system employing TDD, by dynamically setting the link direction, interference between adjacent cells can be reduced while improving throughput.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Although, for example, in the above embodiments, the assumed radio communication system is compliant with LTE or LTE-Advanced, the present technology is not limited to this example. For example, the assumed radio communication system may be a radio communication system which is similar to LTE or LTE-Advanced, or may be a radio communication system which is compliant with a standard which is further developed from LTE or LTE-Advanced.

Also, although, in the above embodiments, a communication control device which performs a communication control on a cell is an eNodeB of LTE or LTE-Advanced, the present technology is not limited to this example. For example, the communication control device may be a base station compliant with other communication standards, or may be a device which is a part of the base station. Also, the communication control device may be another device which controls a base station.

Also, although, in the above embodiments, a terminal device which communicates in a cell is a UE of LTE or LTE-Advanced, the present technology is not limited to this example. For example, the terminal device may be a terminal device compliant with another communication standard.

Additionally, the present technology may also be configured as below.

(1)

A communication control device including:

a radio communication unit which communicates with one or more terminal devices in a cell over a channel in which a link direction is allowed to be dynamically set for each sub-frame which is a unit of time in radio communication; and a control unit which controls allocation of communication resources to the terminal device based on the setting of the link direction of the channel and a location of the terminal device in the cell.

(2)

The communication control device according to (1), wherein the channel includes at least a first frequency band and a second frequency band, the communication control device further includes a setting unit which dynamically sets a link direction for each sub-frame of the first frequency band, and sets a link direction for each sub-frame of the second frequency band so that a difference in link direction between the cell and a cell related to the cell is reduced, and the control unit does not allocate communication resources of the first frequency band to a terminal device which is located in a peripheral portion of the cell.

(3)

The communication control device according to (2), wherein the related cell is a cell which is adjacent to the cell.

(4)

The communication control device according to (3), wherein the cell is a macrocell which covers all or part of a small cell, and the setting unit causes a communication node in the small cell to set a link direction for each sub-frame in the small cell so that a difference in link direction between the cell and the small cell is reduced.

(5)

The communication control device according to (4), wherein the setting unit, when the small cell is located in a peripheral portion of the cell, causes the communication node of the small cell to set the link direction of the second frequency band in the small cell so that a difference in link direction between the cell and the small cell is reduced.

(6)

The communication control device according to (5), wherein the communication node, when the small cell is located in a peripheral portion of the cell, dynamically sets a link direction for each sub-frame of a frequency band which is different from the second frequency band, and does not allocate communication resources of the different frequency band to a terminal device which is located in a peripheral portion of the small cell.

(7)

The communication control device according to any one of (4) to (6), wherein
the setting unit, when the small cell is not located in a peripheral portion of the cell, causes the communication node in the small cell to set the link direction of the first frequency band in the small cell so that a difference in link direction between the cell and the small cell is reduced.

(8)

The communication control device according to (7), wherein
the communication node, when the small cell is not located in a peripheral portion of the cell, dynamically sets a link direction for each sub-frame of a frequency band which is different from the first frequency band, and does not allocate communication resources of the different frequency band to a terminal device which is located in a peripheral portion of the small cell.

(9)

The communication control device according to any one of (4) to (8), wherein
the setting unit notifies the communication node of the link direction for each sub-frame of the first frequency band or the link direction for each sub-frame of the second frequency band which have been set by the setting unit, and causes the communication node to set the link direction for each sub-frame in the small cell.

(10)

The communication control device according to any one of (4) to (9), wherein
the control unit reduces transmission power in the cell in a sub-frame in which a link direction in the cell is different from a link direction in the small cell.

(11)

The communication control device according to (2), wherein
the cell is a small cell, and
the related cell is a macrocell which covers all or part of the cell.

(12)

The communication control device according to (11), wherein
in the related cell, communication resources of a frequency band corresponding to a location of a terminal device are allocated to the terminal device, and
the second frequency band is a frequency band which is allocated to a terminal device which is located in a peripheral portion of the related cell when the cell is located in a peripheral portion of the related cell, and a frequency band which is allocated to a terminal device which is not located in a peripheral portion of the related cell when the cell is not located in a peripheral portion of the related cell.

(13)

The communication control device according to (11) or (12), wherein
the control unit requests a communication node of the related cell to reduce transmission power in the related cell in a sub-frame in which the link direction of the second frequency band in the cell is different from the link direction of the second frequency band in the related cell.

(14)

The communication control device according to any one of (2) to (13), wherein
the setting unit statically or quasi-statically sets the link direction for each sub-frame of the second frequency band.

(15)

The communication control device according to any one of (2) to (14), wherein
the first frequency band and the second frequency band are each a component carrier.

(16)

The communication control device according to (1), wherein
the control unit does not allocate communication resources in a sub-frame in which a link direction in the cell is different from a link direction in a cell related to the cell to a terminal device which is located in a peripheral portion of the cell.

(17)

The communication control device according to (16), wherein
the related cell is a cell which is adjacent to the cell.

(18)

The communication control device according to (16), wherein
the cell is a small cell, and
the related cell is a macrocell which covers all or part of the cell.

(19)

A communication control method including:
communicating with one or more terminal devices in a cell over a channel in which a link direction is allowed to be dynamically set for each sub-frame which is a unit of time in radio communication; and
controlling allocation of communication resources to the terminal device based on the setting of the link direction of the channel and a location of the terminal device in the cell.

(20)

A terminal device including:
a radio communication unit which communicates with a base station in a cell over a channel in which a link direction is allowed to be dynamically set for each sub-frame which is a unit of time in radio communication,
wherein the radio communication unit communicates with the base station according to allocation of communication resources to the terminal device itself by the base station based on the setting of the link direction of the channel and a location of the terminal device itself in the cell.

REFERENCE SIGNS LIST 10 cell
11, 31, 41 eNodeB
13, 33, 43 downlink signal
23, 25, 27 uplink signal
21 UE
30 macrocell
40 small cell
100 eNodeB
110 radio communication unit
120 network communication unit
130 storage unit
140, 150, 160, 170 processing unit
141 terminal location measurement unit
143 traffic rate measurement unit
145, 155, 165 link direction setting unit
147, 167, 177 resource control unit
149, 159, 169, 179 power control unit
200 user equipment (UE)
210 radio communication unit 220 storage unit
230 processing unit

The invention claimed is:

1. A communication control device comprising:
circuitry configured to:
communicate with one or more terminal devices over a channel in which a link direction can be changed for individual sub-frames, wherein a sub-frame is a unit of time in radio communication; and
control transmission power of individual sub-frames based on sub-frame type,
wherein the channel includes at least a first frequency band and a second frequency band, the first frequency band and the second frequency band are aggregated to be used for carrier aggregation, and the circuitry is configured to set a first link direction for individual sub-frames of the first frequency band to be at least partially different from a second link direction for individual sub-frames of the second frequency band.

2. A terminal device comprising:
circuitry configured to:
communicate with a communication control device in a cell over a channel in which a link direction can be changed for individual sub-frames, wherein a sub-frame is a unit of time in radio communication,
wherein transmission power of individual sub-frames is controlled based on sub-frame type, and
wherein the channel includes at least a first frequency band and a second frequency band, the first frequency band and the second frequency band are aggregated to be used for carrier aggregation, and the circuitry is configured to set a first link direction for individual sub-frames of the first frequency band to be at least partially different from a second link direction for individual sub-frames of the second frequency band.

3. The terminal device of claim 2, wherein the link direction for the individual sub-frames can be changed to a downlink direction.

4. The terminal device of claim 2, wherein one or more second sub-frames have a link direction fixed in a downlink direction.

5. The terminal device of claim 2, wherein the transmission power is controlled to reduce interference of downlink and uplink signals in different cells.

6. The terminal device of claim 2, wherein the transmission power is different in sub-frames of different types.

7. The terminal device of claim 2, wherein the cell is a first cell, and wherein the link direction is changed based on a third link direction of a sub-frame in a second cell.

8. The terminal device of claim 7, wherein the second cell neighbors or overlaps with the first cell.

9. The terminal device of claim 2, wherein the circuitry is configured to communicate with the communication control device using time-division duplexing in which the sub-frame is a unit of time in the time-division duplexing.

10. The terminal device of claim 2, wherein the second link direction is set to reduce a difference between link directions of sub-frames of the cell and a second cell.

11. The communication control device of claim 1, wherein the link direction for the individual sub-frames can be changed to a downlink direction, and the circuitry is configured to communicate with one or more terminal devices using one or more second sub-frames having a link direction fixed in a downlink direction.

12. The communication control device of claim 1, wherein the circuitry is configured to control the transmission power to reduce interference of downlink and uplink signals in different cells.

13. The communication control device of claim 1, wherein the circuitry is configured to control the transmission power to be different in sub-frames of different types.

14. The communication control device of claim 1, wherein the cell is a first cell, and wherein the circuitry is configured to change the link direction based on a third link direction of a sub-frame in a second cell.

15. The communication control device of claim 1, wherein the circuitry is configured to communicate with one or more terminal devices using time-division duplexing in which the sub-frame is a unit of time in the time-division duplexing.

16. The communication control device of claim 1, wherein the circuitry is configured to set the second link direction to reduce a difference between link directions of sub-frames of the cell and a second cell.

17. The communication control device of claim 1, wherein the cell is a first cell and the circuitry is configured to request a communication node of a second cell to reduce transmission power in a sub-frame in which a third link direction of the second cell is different from the link direction of the first cell.

* * * * *